(12) United States Patent
Konik et al.

(10) Patent No.: US 10,216,741 B2
(45) Date of Patent: *Feb. 26, 2019

(54) MANAGING A COMPUTERIZED DATABASE USING A VOLATILE DATABASE TABLE ATTRIBUTE

(71) Applicant: International Business Machines Corporation, Armonk, NY (US)

(72) Inventors: Rafal P. Konik, Oronoco, MN (US); Roger A. Mittelstadt, Byron, MN (US); Brian R. Muras, Rochester, MN (US); Mark W. Theuer, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 1086 days.

This patent is subject to a terminal disclaimer.

(21) Appl. No.: 14/582,167

(22) Filed: Dec. 23, 2014

(65) Prior Publication Data

US 2016/0171033 A1  Jun. 16, 2016

Related U.S. Application Data

(63) Continuation of application No. 14/566,248, filed on Dec. 10, 2014.

(51) Int. Cl.
*G06F 17/30* (2006.01)

(52) U.S. Cl.
CPC .. *G06F 17/30076* (2013.01); *G06F 17/30079* (2013.01); *G06F 17/30091* (2013.01);

(Continued)

(58) Field of Classification Search
CPC ............ G06F 17/303; G06F 17/30386; G06F 17/30412; G06F 17/30575
See application file for complete search history.

(56) References Cited

U.S. PATENT DOCUMENTS

| 5,018,060 A | 5/1991 | Gelb et al. |
| 5,758,345 A | 5/1998 | Wang |

(Continued)

FOREIGN PATENT DOCUMENTS

WO  2013100936 A1  7/2013

OTHER PUBLICATIONS

Anonymous, "PostgreSQL, 8.3.23 Documentation Chapter 34, Extending SQL, 34.6 Function Volatility Categories", published on-line by The PostgreSQL Global Development Group at https://www.postgresql.org/docs/8.3/static/xfunc-volatility.html, 2013.

(Continued)

*Primary Examiner* — Jeff A Burke
*Assistant Examiner* — Thong H Vu
(74) *Attorney, Agent, or Firm* — Roy W. Truelson

(57) ABSTRACT

A respective volatility attribute associated with each of one or more tables of a computerized database is used in any of various aspects to (a) determine how table data is stored in a physical storage device; (b) regulate the use of a materialized query table using database table data; and/or (c) influence circumstances under which indexes are created or advised by database analytic software. Various optional additional uses of a volatility attribute to manage a database are disclosed. Preferably, database parameters are automatically monitored over time and database table volatility state is automatically determined and periodically adjusted.

12 Claims, 14 Drawing Sheets

(52) U.S. Cl.
CPC .. *G06F 17/30309* (2013.01); *G06F 17/30339* (2013.01); *G06F 17/30383* (2013.01); *G06F 17/30463* (2013.01)

(56) References Cited

U.S. PATENT DOCUMENTS

| | | | |
|---|---|---|---|
| 6,061,692 | A | 5/2000 | Thomas et al. |
| 6,101,541 | A | 8/2000 | Ellesson et al. |
| 7,177,855 | B2 * | 2/2007 | Witkowski ............ G06F 17/246 |
| | | | 707/718 |
| 7,212,997 | B1 | 5/2007 | Pine et al. |
| 7,761,403 | B2 * | 7/2010 | Witkowski ........ G06F 17/30592 |
| 8,386,463 | B2 | 2/2013 | Bestgen et al. |
| 8,396,769 | B1 | 3/2013 | Selig et al. |
| 8,515,863 | B1 | 8/2013 | Morejon et al. |
| 8,700,602 | B2 | 4/2014 | Schapker et al. |
| 8,745,633 | B2 | 6/2014 | Jayaraman et al. |
| 9,015,146 | B2 | 4/2015 | Richards et al. |
| 9,465,937 | B1 | 10/2016 | Spiegel et al. |
| 9,495,396 | B2 * | 11/2016 | Ignacio ................. G06F 17/303 |
| 9,703,813 | B2 | 7/2017 | Hegde et al. |
| 2002/0120620 | A1 | 8/2002 | Chan et al. |
| 2002/0199075 | A1 | 12/2002 | Jacobs |
| 2003/0140207 | A1 | 7/2003 | Nagase et al. |
| 2005/0125452 | A1 | 6/2005 | Ziauddin et al. |
| 2005/0228964 | A1 | 10/2005 | Sechrest et al. |
| 2006/0167960 | A1 | 7/2006 | Lomet |
| 2008/0147448 | A1 | 6/2008 | McLaughlin et al. |
| 2008/0208820 | A1 | 8/2008 | Usey et al. |
| 2008/0215614 | A1 * | 9/2008 | Slattery ............. G06F 17/30306 |
| 2008/0256069 | A1 | 10/2008 | Eder |
| 2009/0055346 | A1 | 2/2009 | Chijiiwa et al. |
| 2009/0077135 | A1 | 3/2009 | Yalamanchi et al. |
| 2009/0240711 | A1 | 9/2009 | Levin |
| 2009/0271360 | A1 | 10/2009 | Bestgen et al. |
| 2010/0153409 | A1 | 6/2010 | Joshi et al. |
| 2012/0079174 | A1 | 3/2012 | Nellans et al. |
| 2012/0109985 | A1 | 5/2012 | Chandrasekaran |
| 2012/0150791 | A1 | 6/2012 | Willson |
| 2013/0036133 | A1 | 2/2013 | Hogan et al. |
| 2013/0073586 | A1 | 3/2013 | Aubry et al. |
| 2013/0144804 | A1 | 6/2013 | Devaney et al. |
| 2013/0144908 | A1 * | 6/2013 | Geroulo ............ G06F 17/30286 |
| | | | 707/776 |
| 2013/0166566 | A1 | 6/2013 | Lemke et al. |
| 2013/0211866 | A1 | 8/2013 | Gordon et al. |
| 2014/0229654 | A1 | 8/2014 | Goss et al. |
| 2014/0258316 | A1 | 9/2014 | O'Hagan et al. |
| 2014/0297369 | A1 | 10/2014 | Vianello |
| 2014/0297502 | A1 | 10/2014 | Ianev et al. |
| 2015/0019479 | A1 * | 1/2015 | Buehne ................. G06F 17/303 |
| | | | 707/609 |
| 2015/0058438 | A1 | 2/2015 | Korangy et al. |
| 2015/0088823 | A1 | 3/2015 | Chen et al. |
| 2015/0088844 | A1 | 3/2015 | Stigsen et al. |
| 2015/0106578 | A1 | 4/2015 | Warfield et al. |
| 2015/0278276 | A1 | 10/2015 | Konik et al. |
| 2015/0278304 | A1 | 10/2015 | Konik et al. |

OTHER PUBLICATIONS

International Business Machines Corporation, "List of IBM Patents or Patent Applications Treated as Related", filed in USPTO in present application Nov. 23, 2015.

U.S. Appl. No. 14/566,248, entitled Managing a Computerized Database Using a Volatile Database Table Attribute, filed Dec. 10, 2014.

U.S. Appl. No. 14/566,326, entitled Preferntially Retaining Memory Pages Using a Volatile Database Table Attribute, filed Dec. 10, 2014.

U.S. Appl. No. 14/582,175, entitled Preferentially Retaining Memory Pages Using a Volatile Database Table Attribute, filed Dec. 23, 2014.

U.S. Appl. No. 14/566,369, entitled Adjusting Extension Size of a Database Table Using a Volatile Database Table Attribute, filed Dec. 10, 2014.

U.S. Appl. No. 14/582,180, entitled Adjusting Extension Size of a Database Table Using a Volatile Database Table Attribute, filed Dec. 23, 2014.

Colgan, "Best Practices for Gathering Optimizer Statistics with Oracle Database 12c", Oracle White Paper, Jun. 2013.

Hellerstein, "Quantitiative Data Cleaning for Large Databases", UC Berkeley, Feb. 27, 2008.

Au et al., "Reactive Query Policies: A Formalism for Planning with Volatile External Information", Proceedings of the 2007 IEEE Symposium on Computational Intelligence and Data Mining (CIDM 2007), 2007, pp. 243-250.

Oracle, "Best Practices for Gathering Optimizer Statistics", Apr. 2012, p. 1-22.

* cited by examiner

MANAGING A COMPUTERIZED DATABASE USING A VOLATILE DATABASE TABLE ATTRIBUTE

CROSS REFERENCE TO RELATED APPLICATIONS

This is a continuation of pending U.S. patent application Ser. No. 14/566,248, filed Dec. 10, 2014, entitled "Managing a Computerized Database Using a Volatile Database Table Attribute", which is herein incorporated by reference. This application claims priority under 35 U.S.C. § 120 of U.S. patent application Ser. No. 14/566,248.

The present application is also related to the following commonly assigned U.S. patent applications, each of which is herein incorporated by reference:

U.S. patent application Ser. No. 14/226,095, filed Mar. 26, 2014, entitled "Autonomic Regulation of a Volatile Database Table Attribute";

U.S. patent application Ser. No. 14/312,673, filed Jun. 23, 2014, entitled "Autonomic Regulation of a Volatile Database Table Attribute";

U.S. patent application Ser. No. 14/566,326, filed Dec. 10, 2014, entitled "Preferentially Retaining Memory Pages Using a Volatile Database Table Attribute";

U.S. patent application Ser. No. 14/566,369, filed Dec. 10, 2014, entitled "Adjusting Extension Size of a Database Table Using a Volatile Database Table Attribute";

U.S. patent application Ser. No. 14/582,175, filed the same date as the present application, entitled "Preferentially Retaining Memory Pages Using a Volatile Database Table Attribute"; and U.S. patent application Ser. No. 14/582,180, filed the same date as the present application, entitled "Adjusting Extension Size of a Database Table Using a Volatile Database Table Attribute".

FIELD OF THE INVENTION

The present invention relates to digital data processing, and in particular to the management of relational databases having volatile tables.

BACKGROUND

In the latter half of the twentieth century, there began a phenomenon known as the information revolution. While the information revolution is a historical development broader in scope than any one event or machine, no single device has come to represent the information revolution more than the digital electronic computer. The development of computer systems has surely been a revolution. Each year, computer systems grow faster, store more data, and provide more applications to their users.

Modern computer systems may be used to support a variety of applications, but one common use is the maintenance of large relational databases, from which information may be obtained. Large relational databases usually support some form of database query for obtaining information which is extracted from selected database fields and records. Such queries can consume significant system resources, particularly processor resources, and the speed at which queries are performed can have a substantial influence on the overall system throughput.

Conceptually, a relational database may be viewed as one or more tables of information, each table having a large number of entries or records, also called "tuples" (analogous to rows of a table), each entry having multiple respective data fields (analogous to columns of the table) with a defined meaning. The function of a database query is to find all rows, for which the data in the columns of the row matches some set of parameters defined by the query. A query may be as simple as matching a single column field to a specified value, but is often far more complex, involving multiple field values and logical conditions. A query may also involve multiple tables (referred to as a "join" query), in which the query finds all sets of N rows, one row from each respective one of N tables joined by the query, where the data from the columns of the N rows matches some set of query parameters.

Execution of a query involves retrieving and examining records in the database according to some search strategy. For any given logical query, many different search strategies may be possible, all yielding the same logical result. But although all strategies yield the same logical result, not all search strategies are equal in terms of performance. Various factors may affect the choice of optimum search strategy and the time or resources required to execute the strategy. For example, query execution may be affected by the sequential order in which multiple conditions joined by a logical operator, such as AND or OR, are evaluated. The sequential order of evaluation is significant because the first evaluated condition is evaluated with respect to all the entries in a database table, but a later evaluated condition need only be evaluated with respect to some subset of records which were not eliminated from the determination earlier. Therefore, as a general rule, it is desirable to evaluate those conditions which are most selective first. Another factor may be the order in which records within a particular table are examined. Records in a table may be examined sequentially, sometimes known as a table scan, or may be examined according to an index value. Typically, a table scan examines more records, but an index scan requires, on the average, greater resource to examine each record. Query execution may be affected by any number of factors in addition to those described above.

To support database queries, large databases typically include a query engine which executes the queries according to some automatically selected search (execution) strategy, also known as a "plan", using the known characteristics of the database and other factors. Some large database applications further have query optimizers which construct search strategies, and save the query and its corresponding search strategy for reuse.

An optimal strategy for executing a query will depend not only on the conditions of the query itself, but on various characteristics of the database. For example, where multiple tables are being joined in a single query, the relative sizes of those tables may affect the optimal query execution strategy, it often being desirable to evaluate conditions related to smaller tables first. Query optimizers and query engines may use any of various metadata structures, such as histograms constructed by sampling data in one or more database tables, to estimate the characteristics of the database records and project the effects of alternative query execution strategies on query execution performance.

When a query optimizer constructs a query execution strategy, it may perform sophisticated analysis of multiple alternative query execution strategies, attempting to find an optimal strategy for a particular query. The resources expended in performing this analysis may exceed, and in some cases may far exceed, the resources required to execute the query. Optimization is often justified because a query is expected to be reused multiple times, so that the overhead of constructing and optimizing a query execution strategy is distributed among multiple execution instances.

Sometimes, a database table undergoes rapid and frequent changes in its character. For example, the number of records in the table may fluctuate dramatically, or the values of particular fields may undergo frequent, widespread changes. When this happens, it is difficult or impossible to predict the character of the database table at a particular time, and specifically, at a time when a query might be executed. If a query execution strategy is constructed and optimized based on certain assumptions about the character of the table using data gathered at one time, these assumption may no longer be true at the time that strategy is executed, resulting in poor execution performance.

Because it is known that a query execution strategy is optimized according to certain assumed characteristics of the database, some database managers are configured to automatically re-optimize a query if a database undergoes significant changes. For example, a query can be re-optimized if it references a database table which changes in size by more than a pre-determined threshold. However, if a table is of a type which undergoes rapid and frequent changes, this capability to re-optimize queries can exacerbate the performance problems, since the optimizer may be frequently re-optimizing the query strategy to keep up with the changes to the table.

SQL (Structured Query Language) is a standard, widely used special purpose language for managing data in a relational database system. SQL permits a database designer or other user to specify, through use of a "VOLATILE" attribute, that a particular table in the database is expected to undergo rapid and frequent changes. Database management software can use the VOLATILE attribute, if specified, to alter the way it optimizes queries relating to the subject table. For example, it might optimize according to a generic optimization which makes few or no assumptions about the character of the subject table, it might disable re-optimization based on changes made to the subject table, and/or it might prefer an index access over other types of access such as a table scan or hash scan.

The SQL VOLATILE attribute provides a limited capability to improve database efficiency by optimizing a query differently if the query involves a volatile table. However, a more general and widespread capability to improve database management in various ways by taking into account table volatility has not been appreciated or exploited. Furthermore, many users are unaware of the VOLATILE attribute or do not understand its use. Additionally, because the attribute has only a binary state (on or off), various database management efficiencies which might hypothetically be possible with more complete volatility state information are not available.

Therefore, a need exists, not necessarily generally recognized, for improved techniques for managing relational databases which contain one or more volatile tables.

SUMMARY

At least one respective volatility attribute is associated with each of one or more tables of a structured computerized database. The volatility attribute(s) is/are used in any of various ways to more efficiently manage the database.

In one aspect, the volatility attribute(s) is/are used to determine how table data is stored, in particular by determining a type of storage device and/or access path among multiple types of device and/or access paths in which table data is stored. For example, where multiple possible candidate storage devices or paths have different I/O speeds or bandwidth, the more volatile table data may be stored on devices having higher I/O speed/bandwidth. In particular, a database manager may avoid storing volatile table data on solid state device storage, since these devices tend to have relatively long write times. Placing volatile table data on relatively faster I/O devices may improve system efficiency because a relatively greater number of I/O operations can be expected for the volatile table data than for nonvolatile table data.

In another aspect, the volatility attribute(s) is/are used to manage the maintenance of one or more metadata structures describing data in one or more tables of a database. Several variations of this aspect are disclosed.

In one or more variations, the volatility attribute(s) is/are used to restrict the creation, maintenance or use of materialized query table (MQT), also known as materialized view, data which uses volatile table data. A materialized query table which uses volatile table data may be subject to rapid changes, either making the data soon obsolete or requiring undue overhead burden for updating the MQT. Restricting use of MQTs involving volatile table data may improve system efficiency by avoiding the overhead of MQT creation and maintenance where any performance benefit from the MQT is not justified.

In one or more additional variations, the volatility attribute(s) is/are used to manage the database design, in particular by influencing the circumstances under which indexes are maintained by advising the creation of and/or creating indexes by database analytic software. For example, for certain database environments, queries against data in volatile tables tend to employ index plans for query execution. Database analytic software may in such circumstances favor the creation and automated maintenance of indexes for the volatile tables to provide appropriate query support and thus improve system efficiency.

In an optional use of volatility attributes for managing a database, the volatility attribute(s) is/are used to manage the maintenance of database data in memory of a computer system, particularly by determining, at least in part, the circumstances under which a page of data in memory is paged out of memory. For example, a page from a database table having a higher degree of volatility might be preferentially retained in memory in circumstances in which a page from a lower volatility table would be paged out. In one implementation of this aspect, a page from a table having a high volatility might be pinned in memory to restrict paging out of the data. Keeping volatile table data in memory tends to reduce the need to retrieve it from storage when needed again, reducing paging activity and increasing system efficiency.

In another optional use of volatility attributes for managing a database, the volatility attribute(s) is/are used to adjust the extension size value of a database table file space, i.e., to adjust the amount of additional file space which is allocated to a database table when it is necessary to allocate additional space. For example, a table which is more volatile may receive a larger additional file space allocation than a table which is less volatile. Larger allocations for volatile tables tend to reduce the need for frequent allocations of additional file space, and since each allocation has a certain fixed overhead, this may increase system efficiency.

In one or more preferred embodiments, one or more parameters of a database table are automatically monitored over time and a volatility state of the database table is automatically determined, as described in commonly assigned copending U.S. patent application Ser. No. 14/226, 095, filed Mar. 26, 2014, entitled "Autonomic Regulation of a Volatile Database Table Attribute", which is herein incorporated by reference. However, in any of various additional embodiments, volatility state of a database table may specified by the user in whole or it part, or determined in some other manner. In one or more embodiments, a user may manually designate a table VOLATILE, may manually designate a table not VOLATILE, or may specify that the database management application is to automatically determine whether the table is volatile, the last option being the default.

Additionally, in any of various embodiments, a volatility attribute expressing the volatility state of a database table may be any of a floating point value, a boolean value, or some other form, and/or multiple volatility attributes may be used to express volatility state of a database table. In one or more embodiments, one or more parameters of the database table are captured at regular sampling intervals and a figure of merit representing volatility is computed from the parameter values as a volatility attribute. A boolean volatility attribute may also be derived from this figure of merit. In any of various embodiments, volatility state of a database table may be expressed as a value within a range which may assume any of more than two values (as opposed to simple boolean values 'volatile' and 'nonvolatile'). For example, volatility may be expressed as a floating point value, which could be normalized to a range between 0 and 1, with 0 representing lowest volatility and 1 representing highest. The determinations made in managing a computerized database may then depend on this range of values, permitting a greater degree of flexibility and accuracy.

In one or more embodiments, the database management application supports the SQL database language, and the volatility attribute is or includes the SQL VOLATILE attribute.

By intelligently using volatility attributes to manage a computerized database in accordance with one or more inventive aspects as described herein, available resources may be utilized more efficiently and performance of computer systems providing databases may be improved.

The details of the present invention, both as to its structure and operation, can best be understood in reference to the accompanying drawings, in which like reference numerals refer to like parts, and in which:

DETAILED DESCRIPTION

Figure 1:
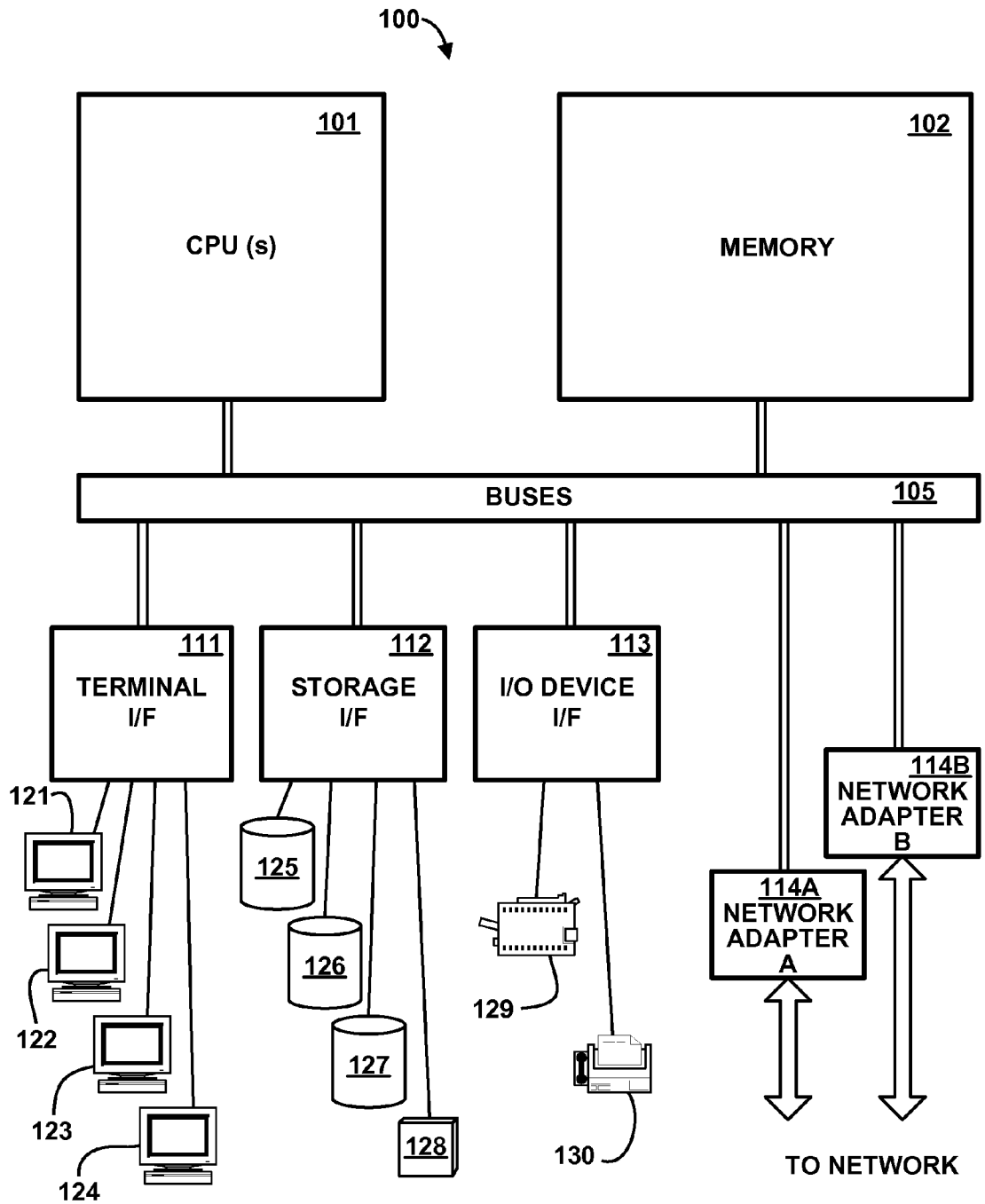
FIG. 1 is a high-level block diagram of the major hardware components of a computer system for use in managing a relational database using at least respective one volatility attribute of each of one or more database tables, according to one or more preferred and/or optional embodiments of the present invention.

Referring to the Drawing, wherein like numbers denote like parts throughout the several views, FIG. 1 is a high-level representation of the major hardware components of a computer system 100 for use in managing a relational database using at least respective one volatility attribute of each of one or more database tables, according to one or more preferred and/or optional embodiments of the present invention. CPU 101 is at least one general-purpose programmable processor which executes instructions and processes data from main memory 102. Main memory 102 is preferably a random access memory using any of various memory technologies, in which data is loaded from storage or otherwise for processing by CPU 101.

One or more communications buses 105 provide a data communication path for transferring data among CPU 101, main memory 102 and various I/O interface units 111-114, which may also be known as I/O processors (IOPs) or I/O adapters (IOAs). The I/O interface units support communication with a variety of storage and I/O devices. For example, terminal interface unit 111 supports the attachment of one or more user terminals 121-124. Storage interface unit 112 supports the attachment of one or more storage devices 125-128, which are typically rotating magnetic disk drive storage devices shown as devices 125-127, although they could be other devices, such as solid state storage devices represented as device 128, or other types of storage devices (not shown), including arrays of disk drives or other device types configured to appear as a single large storage device to a host. I/O device interface unit 113 supports the attachment of any of various other types of I/O devices, such as printer 129 and fax machine 130, it being understood that other or additional types of I/O devices could be used. Network interface adapters 114A, 114B (herein generically referred to as feature 114) support connections to one or more external networks (not shown) for communication with one or more other digital devices. An external network may be any of various local or wide area networks known in the art. Network adapters 114 could support redundant connections to a single network, or could be coupled to separate networks, which may or may not be in communication with each other. While two network adapters 114 and network connections are shown, there may be only a single adapter and connection, or there could be more than two. Such external networks preferably include the Internet, and may include one or more intermediate networks, such as local area networks (not shown), through which communication with the Internet is effected.

It should be understood that FIG. 1 is intended to depict the representative major components of system 100 at a high level, that individual components may have greater complexity than represented in FIG. 1, that components other than or in addition to those shown in FIG. 1 may be present, that the number, type and configuration of such components may vary, and that a complex computer system will typically have more components than represented in FIG. 1. Several particular examples of such additional complexity or additional variations are disclosed herein, it being understood that these are by way of example only and are not necessarily the only such variations.

Although only a single CPU 101 is shown for illustrative purposes in FIG. 1, computer system 100 may contain multiple CPUs, as is known in the art. Although main memory 102 is shown in FIG. 1 as a single monolithic entity, memory 102 may in fact be distributed and/or hierarchical, as is known in the art. E.g., memory may exist in multiple levels of caches, and these caches may be further divided by function, so that one cache holds instructions while another holds non-instruction data which is used by the processor or processors. Memory may further be distributed and associated with different CPUs or sets of CPUs, as is known in any of various so-called non-uniform memory access (NUMA) computer architectures. Although communications buses 105 are shown in FIG. 1 as a single entity, in fact communications among various system components is typically accomplished through a complex hierarchy of buses, interfaces, and so forth, in which higher-speed paths are used for communications between CPU 101 and memory 102, and lower speed paths are used for communications with I/O interface units 111-114. Buses 105 may be arranged in any of various forms, such as point-to-point links in hierarchical, star or web configurations, multiple hierarchical buses, parallel and redundant paths, etc. For example, as is known in a NUMA architecture, communications paths are arranged on a nodal basis. Buses may use, e.g., an industry standard PCI bus, or any other appropriate bus technology. While multiple I/O interface units are shown which separate buses 105 from various communications paths running to the various I/O devices, it would alternatively be possible to connect some or all of the I/O devices directly to one or more system buses.

Computer system 100 depicted in FIG. 1 has multiple attached terminals 121-124, such as might be typical of a multi-user "mainframe" computer system. Typically, in such a case the actual number of attached devices is greater than those shown in FIG. 1, although the present invention is not limited to systems of any particular size. User workstations or terminals which access computer system 100 might also be attached to and communicate with system 100 over a network. Computer system 100 may alternatively be a single-user system, typically containing only a single user display and keyboard input. Furthermore, while certain functional elements of the invention herein are described for illustrative purposes as embodied in a single computer system, the present invention could alternatively be implemented using a distributed network of computer systems in communication with one another, in which different functions or steps described herein are performed on different computer systems. For example, the present invention could be implemented in a so-called cloud computing environment, in which multiple physical computer systems are available to perform work on behalf of multiple clients.

In the preferred embodiment, computer system 100 is a general purpose computer systems capable of being programmed to execute a variety of different functions by loading and executing appropriate software. The functions described herein are performed by appropriate executable software modules installed in the corresponding computer system or systems. However, system 100 could alternatively be or include one or more special-purpose digital data devices for accomplishing the corresponding functions described herein. For example, data in a relational database could be stored on one or more special-purpose data storage devices or servers, accessible to one or more computer systems.

While various system components have been described and shown at a high level, it should be understood that a typical computer system contains many other components not shown, which are not essential to an understanding of the present invention.

Figure 2:
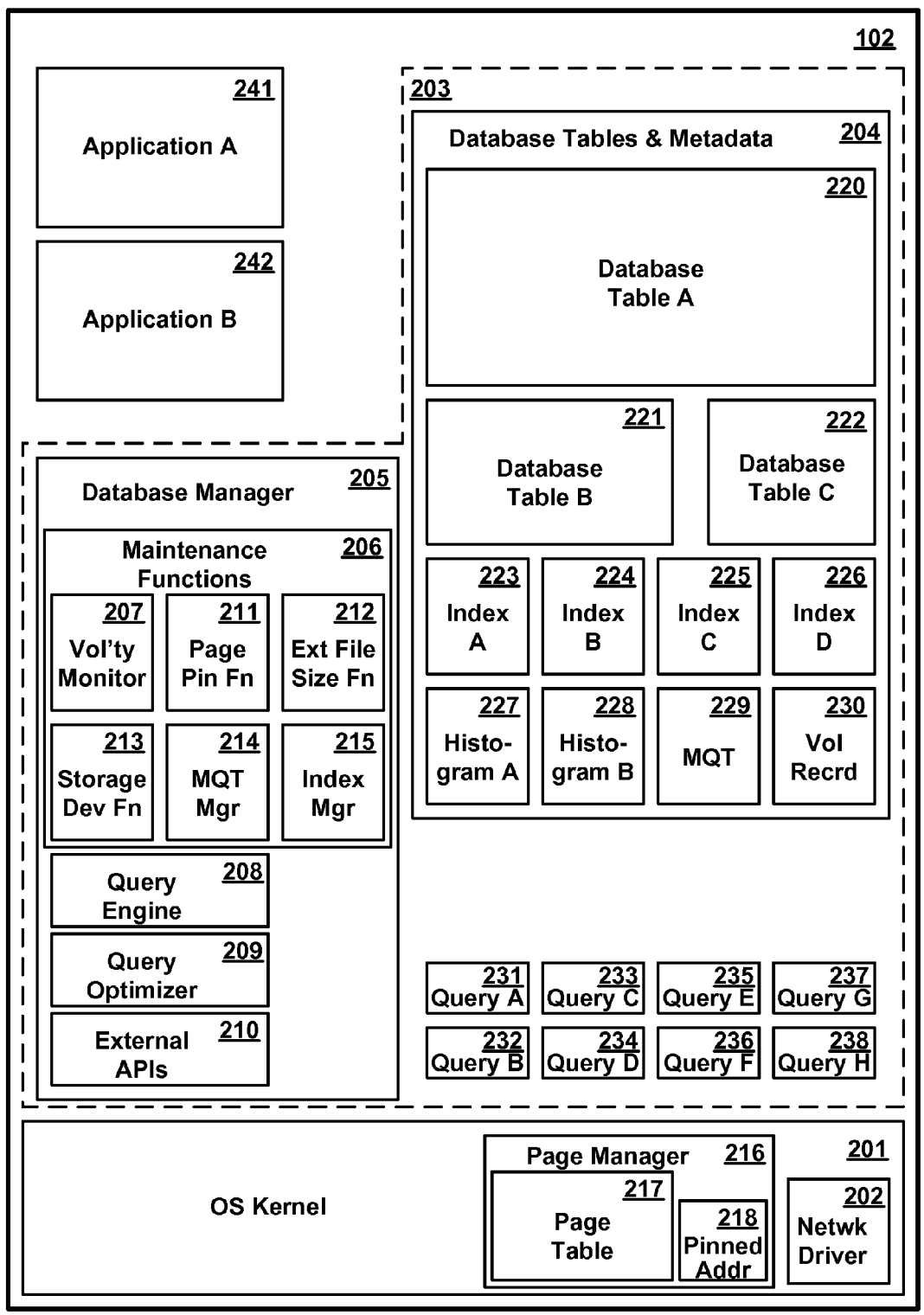
FIG. 2 is a conceptual illustration of the major software components of a computer system for managing a relational database, according to one or more preferred and/or optional embodiments.

FIG. 2 is a conceptual illustration of the major software components of computer system 100 for managing a relational database in memory 102, according to one or more preferred and/or optional embodiments. Operating system kernel 201 is executable code and state data providing various low-level software functions, such as device interfaces, management of memory pages, management and dispatching of multiple tasks, etc. as is well-known in the art. In particular, OS kernel 201 preferably includes one or more network adapter drivers 202 for handling communications with one or more networks via network adapters 114. To support memory paging, OS kernel 201 preferably includes a page manager function 216 which manages a page table 217. Page table 217 comprises one or more data structures which record the allocation of physical segments of memory, referred to as "pages", to virtual memory in one or more virtual address spaces, as is known in the art. In addition to recording the assignment of addresses, page table 217 preferably contains certain metadata used by page manager function 216 in performing page management functions. In particular, this metadata may include a respective "dirty" bit for each memory page, indicating whether the corresponding page has been altered while in memory, and additional metadata used for selecting a page to be removed from memory ("paged out" or "evicted") when it is necessary to retrieve a new page from storage and store it in memory. In accordance with one or more preferred embodiments, metadata in page table 217 includes a respective "pinned" bit for each memory page, indicating whether the corresponding page is pinned in memory, and thus not subject to being paged out. The operating system may pin selective pages for a variety of reasons; for example, certain low-level operating system functions are sometimes pinned. But in particular, in accordance with one or more preferred embodiments, one or more pages representing data in one or more volatile database tables may be pinned in memory by setting the corresponding "pinned" bits. Page table 217 could be structured as a single, literal table, but is often structured as multiple data structures from which a mapping of virtual to physical addresses is derived. As used herein, page table 217 could be structured according to any known or subsequently developed architecture for structuring a page table.

In one or more embodiments, page manager 216 further includes a record of pinned addresses 218, which is used for managing the pinning of volatile database table pages, as described further herein. One embodiment of such a pinned address record is a record containing a variable number of entries, each entry corresponding to a range of virtual addresses to be pinned when in memory, each entry having a starting virtual address and a length. Other or additional fields could be contained in the entries. Such an embodiment could be used in computer system architectures in which each database table has a consistent virtual address for all users. If the virtual address of the database table might vary depending on the user accessing it, the pinned address record could use some other mechanism, such as storage addresses in place of virtual addresses, for consistency; such a mechanism may require one or more additional levels of translation.

A structured relational database 203 contains database tables and metadata 204 and database management software 205 for managing the data, for which computer system 100 provides access to one or more users, who may be directly attached to system 100 or may be remote clients who access system 100 through a network using a client/server access protocol. Preferably, database 203 further contains one or more saved query objects 231-238. Additionally, one or more software application programs 241,242 execute various functions and access data in database 203 to perform useful work on behalf of respective one or more users.

Database tables and metadata 204 include one or more tables 220-222 (of which three are shown for illustrative purposes in FIG. 2, it being understood that the number may vary). As is known in the database art, a database table is a data structure logically in the form of a table having multiple records (also called entries or tuples), each record having at least one, and usually multiple, fields (also called attributes). The "rows" of the table correspond to the records, and the "columns" correspond to the fields. Although tables 220-222 are data structures which are logically equivalent to tables, they may be arranged in any suitable structure known in the database art. Database tables 220-222 might contain almost any type of data which is useful to users of a computer system.

Figure 3:
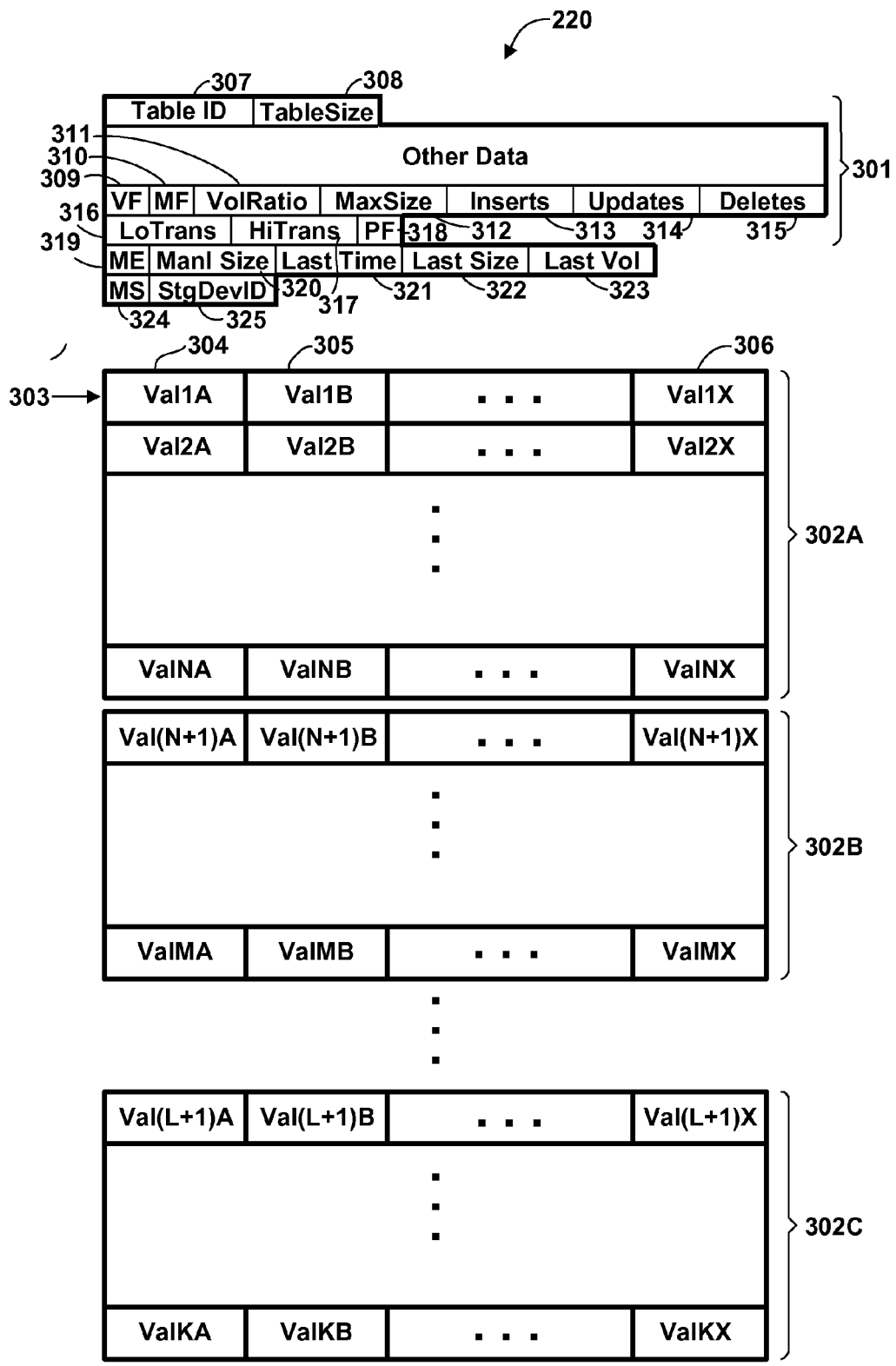
FIG. 3 is a conceptual representation of the structure of a database table, including header data, according to one or more preferred and/or optional embodiments.

FIG. 3 is a conceptual representation of the structure of a database table 220, according to one or more preferred and/or optional embodiments, it being understood that tables 221, 222 could have similar structure. Referring to FIG. 3, table 220 includes a header portion 301 and one or more table partitions 302A,302B,302C (herein generically referred to as feature 302). Each table partition 302 contains multiple records 303 (also called rows, entries, or tuples), each record 303 containing multiple data values logically organized as multiple fields 304-306. A large database table will typically have multiple partitions 302, each partition containing a respective disjoint subset of the records of the database table as a whole, although smaller tables may have only a single partition. Each database table partition 302 is conceptually represented in FIG. 3 as a table or array, in which the rows represent database records, and the columns represent database fields. However, as is known in the art, the actual structure of the database table in memory typically varies due to the needs of memory organization accommodating database updates, and so forth. A database table will often occupy non-contiguous blocks of memory; database records may vary in length; some fields might be present in only a subset of the database records; and individual entries may be non-contiguous. Portions of the data may even be present on other computer systems.

Associated with database table 220 is header portion 301. Header 301 is in fact data separate from the collection of records 303, and may be considered part of the database table 220 or may be considered a separate data structure. The header may or may not be stored in locations contiguous to the records 303. Header contains data for identifying the contents of the table and, where it is located (e.g., pointers, arrays and other structures which identify the locations of the various partitions 302), certain essential parameters of the table, and so forth. In particular, in accordance with one or more preferred embodiments, header 301 contains a table identifier 307 and a current table size 308 (i.e., the number of record currently in table 220). In accordance with one or more embodiments, the header further contains various data useful for monitoring and determining volatility of the table. These latter fields include a volatile flag 309, a manual set flag 310, a volatility ratio 311, a maximum table size 312, a number of inserts 313, a number of updates 314, a number of deletes 315, a low transition count 316, and a high transition count 317. In accordance with one or more optional embodiments, the header further contains a pinned flag 318 indicating whether pages in the header have been subject to pinning in memory; this flag is used in certain embodiments to pin volatile table data in memory, as described in greater detail herein. Additionally, in accordance with one or more optional embodiments, the header further contains a manual extension file size flag 319 indicating whether extension file size is to be manually specified, a manual extension file size 320 indicating the manually specified extension file size, a last extension time 321 indicating a time at which the database file was most recently extended (allocated additional space), a last extension size 322 indicating the amount of additional file space added to the database file in the most recent extension, and a last extension volatility 323 indicating the volatility attribute of the database file at the time of the most recent extension. Fields 319-323 may be used in certain embodiments to automatically adjust the extension file size, as described in greater detail herein. Additionally, in accordance with one or more optional embodiments, the header further contains a manually specified storage flag 324 and a storage device identifier 325. Fields 324 and 325 are used in certain embodiments to manually specify the storage device upon which a database table file will be stored (or allow the system to choose, which choice may be based upon volatility of the database table).

Although a single header 301 is shown in FIG. 3, in will be understood that, where volatility information is independently maintained for each partition 302 of the database table, some or all of these fields may be replicated for each partition, either in a single header or in separate headers for each partition. Furthermore, it will be understood that, where volatility information is maintained independently for different data fields 304-306 of the database table, certain header fields may be separately maintained for each data field.

Volatile flag 309 is a boolean value indicating whether the table is considered volatile or non-volatile. In the preferred embodiment, volatile flag 309 is the value of the SQL 'VOLATILE' attribute. Manual set flag 310 is also a boolean value, indicating whether volatility state (as indicated by volatile flag 309 and/or volatility ratio 311) of a table will be set manually by a user or determined automatically by the database manager, as described herein. Preferably, where the database manager has the capability to automatically determine table volatility state, the manual flag is set 'OFF' by default, indicating that the database manager automatically determines table volatility state. Volatility ratio 311 is preferably a non-negative floating point value indicating a degree of volatility of the subject table, computed as described herein. The storing of both the boolean volatile flag and the floating point volatility ratio allows different database management functions to use different values for different purposes. For example, since the SQL standard specifies only a boolean 'VOLATILE' attribute, the boolean volatile flag 309 is available for use by legacy functions which take this value as input. At the same time, where performance is particularly sensitive to table volatility, a function may be migrated to use the floating point volatility ratio in place of the simple boolean value for enhanced precision.

In accordance with one or more embodiments, volatility ratio 311 is periodically updated by sampling certain events during a sampling interval. Maximum table size 312 records the maximum number of records in database table 220 during a current sampling interval. Number of inserts 313, number of updates 314, and number of deletes 315 record the number of record insert operations, record update operations, and record delete operations, respectively, performed on the subject database table during the current sampling interval. Inserts 313, updates 314, and deletes 315 are simple counters which are incremented whenever the corresponding operation (insert, update or delete) is performed. Additionally, whenever an insert operation is performed, MaxSize 312 is compared with TableSize 308 after the insert, and if TableSize is greater than MaxSize, then MaxSize is set to the value of TableSize. As explained in further detail herein, both the volatile flag 309 (where determined automatically) and volatility ratio 311 are cumulative values which to some degree represent an averaging of historical data with the current interval data. Low transition count 316 and high transition count 317 are counts of the number of consecutive sampling intervals in which the volatility ratio was determined to be below or above a respective transition threshold; these values are used to regulate transitioning from a volatile to non-volatile table state (or vice-versa).

In an alternative embodiment, a separate update field (not shown) could be maintained for each field in the table to record the number of updates affecting the corresponding field. Such information could be used to weight updates to different fields differently when computing a volatility ratio. Furthermore, a separate volatility ratio could be maintained for each field based on the number of updates to the corresponding field. It would be possible to utilize such information to optimize or selectively re-optimize queries with respect to the subject field(s).

Associated with the database tables are one or more auxiliary data structures 223-230, also sometimes referred to as metadata (of which eight are represented in FIG. 2, it being understood that the number and type of such structures may vary). Auxiliary data structures characterize the structure of the database and data therein, and are useful in various tasks involved in database management, particularly in executing queries against the database. Examples of auxiliary data structures include database indexes 223-226, histograms 227-228, and materialized query table (MQT) 229, it being understood that other types of metadata may exist.

In particular, in accordance with one or more optional embodiments, metadata includes at least one volatility history record 230 which records historical information regarding selective attributes of one or more database tables, from which inferences of volatility may be drawn, as described in greater detail herein.

Figure 4:
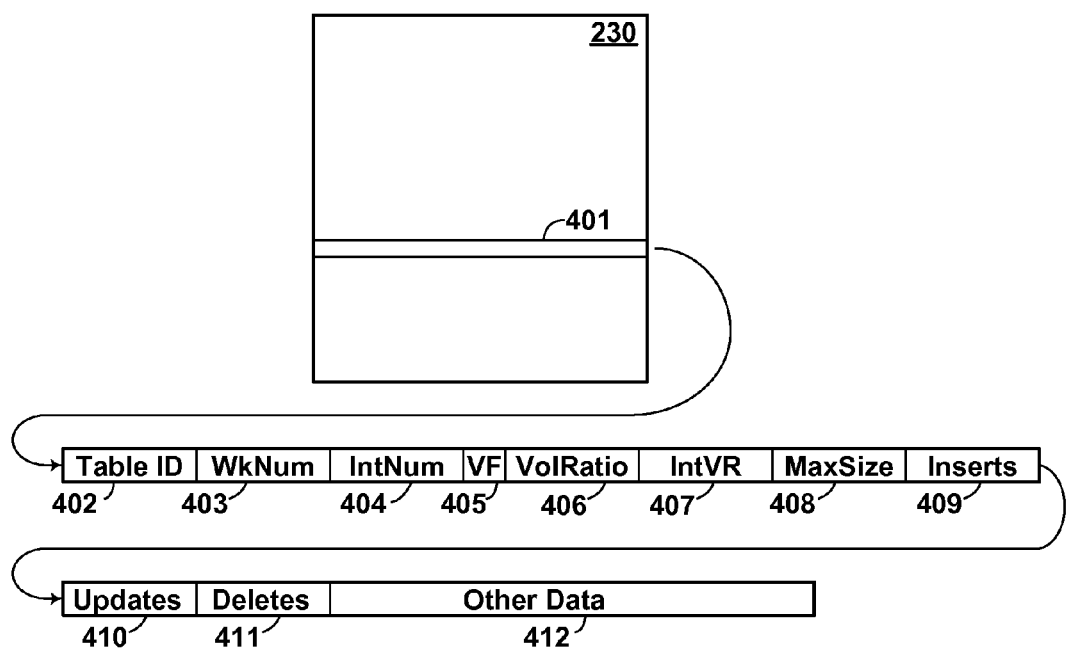
FIG. 4 is a conceptual representation of the structure of a volatility history record, according to one or more preferred and/or optional embodiments.

FIG. 4 is a conceptual representation of the structure of a volatility history record 230, according to the preferred embodiment. Referring to FIG. 4, volatility history record 230 is preferably another database table having multiple entries 401, in which each entry corresponds to the volatility state of a particular database table for a particular time interval. Each entry 401 contains a table identifier 402 identifying the database table to which the entry pertains, and one or more time interval identifiers, represented in the exemplary entry of FIG. 4 as a week number 403 and an interval number 404. Week number 403 indicates the calendar week in which the sample data was taken, and interval number 404 indicates the number of the time interval within that week. The time interval might be the same as the sampling interval at which data is sampled and captured as described with respect to FIG. 5 below, or might be an aggregation of multiple sampling intervals. For example, where the sampling interval is one minute, the time interval might aggregate data over an hour to obtain a more long term picture of database characteristics, so that interval number 404 is an integer in the range of 1 to 168. Volatile flag 405 contains the state of volatile flag 309 at the end of the corresponding time interval, after the same has been updated at the end of the time interval based on data captured in the time interval. Volatility ratio 406 similarly contains the value of the volatility ratio 311, after the same has been updated at the end of the time interval. Interval volatility ratio 407 is a volatility ratio computed solely for the subject interval, without taking into account data from previous intervals. Maximum table size 408, number of inserts 409, number of updates 410 and number of deletes 412 represent the totals of these values (i.e., the values in fields 312-315, respectively) at the end of the subject time interval. The entry 401 may contain other data 412 useful to understanding the behavior of the subject table. As in the case of data in header 301, in one or more alternative embodiments there could be separate update counts for each field in the database and/or separate volatility ratios for different fields. Furthermore, volatility history record 230 could be subsumed in a larger record which generally records sampled data regarding the history of a database table, which may be useful for other purposes not related to the present invention.

Database manager 205 is executable computer programming code which executes on CPU 101 to provide basic functions for the management of database 203. Database manager 205 may theoretically support an arbitrary number of database tables, which may or may not have related information, although only three tables are shown in FIG. 2. Database manager 205 preferably contains administrative maintenance functions 206 which automatically perform certain functions to manage the database and/or allow authorized users to perform basic administrative operations with respect to the database, such as defining and editing database table definitions, creating, editing and removing records in the database, viewing records in the database, defining database auxiliary data structures such as indexes and materialized query tables, views, and so forth. In one or more preferred embodiments herein, administrative functions include one or more of: (a) a storage device selection function 213 for selecting a storage device for storing certain database table data based on volatility; (b) an MQT manager 214 which manages the formation and maintenance of MQTs; and (c) an index manager 215 which manages the formation and maintenance of indexes. Additionally, in one or more optional embodiments, administrative functions may include a page pinning function 211 for preferentially retaining in memory certain pages from volatile database tables, and/or an extension file size function 212 for automatically adjusting the extension size of certain database tables based on volatility. Preferably, administrative maintenance functions 206 further include a volatility monitor 207 which maintains selective volatility data the database table header 301, and optionally in volatility history record 230, and automatically infers the volatility of selective database tables from such data. However, in one or more alternative embodiments, table volatility is manually specified by an authorized used such as a system administrator, and the one or more maintenance functions which are dependent on table volatility use the manually specified volatility value(s). Certain of these functions may be available only to system administrators and the like, while others are available to clients.

Database manager 205 preferably further includes a query engine 208 for executing queries against data in database tables 220-222 and a query optimizer 209 for generating optimized query execution plans for use by query engine 208 in executing queries. Database manager 205 further preferably includes an external interface 210 having one or more application programming interfaces (APIs) by which external applications can access data in database 203 either by invoking query engine 208 or through other means. Database manager 205 may further contain any of various more advanced database functions, as are known in the art. Database manager could be a generic database management system, such as one implementing a structured query language (SQL) query protocol, but it might alternatively query and structure data according to some other protocol and/or that it might be a custom designed database management system. Although database manager 205 is represented in FIG. 2 as an entity separate from operating system kernel 201, it will be understood that in some computer architectures various database management functions are integrated with the operating system.

Query optimizer 209 generates query execution strategies (also known as "plans", "access plans", "query plans" or "execution plans") for executing database queries. As is known in the database art, the amount of time or resource required to perform a complex query on a large database can vary greatly, depending on various factors, such as the availability of an index or other auxiliary data structure, the amount of resources required to evaluate each condition, and the expected selectivity (i.e., number of records eliminated from consideration) of the various logical conditions. Optimizer 209 determines an optimal execution strategy according to any optimizing algorithm, now known or hereafter developed, and generates an execution strategy according to the determination. The execution strategy is a defined series of steps for performing the query, and thus is, in effect, a computer program. The optimizer 209 which generates the execution strategy performs a function analogous to that of a compiler, although the execution strategy data is not necessarily executable-level code. It is, rather, a higher-level series of instructions which are understood and executed by the query engine 208.

The query optimizer 209 uses various metadata to predict the effectiveness of one or more alternative query execution strategies or sub-strategies, and selects an optimum strategy accordingly. The accuracy of these predictions, and the ultimate performance of execution strategies constructed by the query optimizer, is therefore dependent on the degree to which the metadata reflects the underlying reality of the database. For example, a histogram is typically constructed by sampling data in a database table at a particular time. If the histogram is not representative of the actual data in the table (either because the sampling was skewed for some reason, or because the data has significantly changed since the sample was collected), then the strategy which was constructed based on the assumed character of the table using the histogram may be less than optimal.

In one or more embodiments herein, the query optimizer 209 takes into account the volatility of the table or tables which are subject to a query when constructing an optimal query execution strategy for executing the query. This may be done in any of various ways. For example, because volatility indicates that information about the characteristics of a table may be unreliable, the optimizer may make "default" or "average" assumptions about a table's parameters (default or average size, cardinality, and so forth), rather than rely on information in the metadata. However, this example is not necessarily exhaustive, and any query optimization technique, now known or hereafter developed, which takes into account the volatility of a database table might be used by optimizer 209. Furthermore, it will be understood that use of a volatility attribute by the optimizer to construct an optimal query execution strategy is an optional enhancement and not required to use the volatility for other purposes according to one or more aspects of the present invention.

A query can be saved as a persistent storage object in memory, as represented in FIG. 2 as saved query objects 231-238, and can be written to disk or other storage. Once created by optimizer 209, a query execution strategy can be saved with the query as part of the persistent storage object. For a given query, it is possible to generate and save one, or optionally multiple, optimized execution strategies. The query can be invoked, and a saved query execution strategy re-used (re-executed), many times. For a frequently executed query, saving and re-using the query execution strategy can result in considerable performance enhancement. Although eight query objects are represented in FIG. 2, it will be understood that the actual number of such objects may vary. Although these are referred to herein as "query objects", the use of the term "object" is not meant to imply that database manager 205 or other components are necessarily programmed using so-called object-oriented programming techniques, or that the query object necessarily has the attributes of an object in an object-oriented programming environment.

Although one database 203 having three database tables 220-223 and eight auxiliary structures 223-230 are shown in FIG. 2, the number of such entities may vary, and could be much larger. Computer system 100 may contain multiple databases, each database may contain multiple tables, and each database may have associated with in multiple indexes, MQTs, histograms, views, volatility records, and/or other auxiliary data structures not illustrated. Alternatively, some entities represented in FIG. 2 might not be present in all databases. Additionally, database 203 may be logically part of a larger distributed database which is stored on multiple computer systems. Although database manager 205 is represented in FIG. 2 as part of database 203, the database manager, being executable code, is sometimes considered an entity separate from the "database", i.e., the data.

In addition to database management system 205, one or more user applications 241, 242 executing on CPU 101 may access data in database tables 220-222 to perform tasks on behalf of one or more users. Such user applications may include, e.g., sales transactions, inventory management, personnel records, accounting, code development and compilation, mail, calendaring, or any of thousands of user applications. Some of these applications may access database data in a read-only manner, while others have the ability to update data. There may be many different types of read or write database access tasks, each accessing different data or requesting different operations on the data. For example, on task may access data from a specific, known record, and optionally update it, while another task may invoke a query, in which all records in the database are matched to some specified search criteria, data from the matched records being returned, and optionally updated. Furthermore, data may be read from or written to database tables 220-222 directly, or may require manipulation or combination with other data supplied by a user, obtained from another database, or some other source. Applications 241-242 typically utilize function calls to database manager 205 through external APIs 210 to access data in database 203, and in particular, to execute queries against data in the database, although in some systems it may be possible to independently access data in database 203 directly from the application. One or more of applications 241-242 may function as a server acting on behalf of remote clients communicating with computer system 100 over a network. Although two applications 241, 242 are shown for illustrative purposes in FIG. 2, the number of such applications may vary.

Various software entities are represented in FIG. 2 as being separate entities or contained within other entities. However, it will be understood that this representation is for illustrative purposes only, and that particular modules or data entities could be separate entities, or part of a common module or package of modules. Furthermore, although a certain number and type of software entities are shown in the conceptual representations of FIG. 2, it will be understood that the actual number of such entities may vary, and in particular, that in a complex database environment, the number and complexity of such entities is typically much larger. Additionally, although software components 203-238 are depicted in FIG. 2 on a single computer system 100 for completeness of the representation, it is not necessarily true that all programs, functions and data will be present on a single computer system or will be performed on a single computer system. For example, user applications which access the data base may be on a separate system from the database; the database may be distributed among multiple computer systems, so that queries against the database are transmitted to remote systems for resolution, and so forth.

While the software components of FIG. 2 are shown conceptually as residing in memory 102, it will be understood that in general the memory of a computer system will be too small to hold all programs and data simultaneously, and that information is typically stored in data storage, comprising one or more mass storage devices such as rotating magnetic disk drives 125-127 or solid state storage device 128, and that the information is paged into memory by the operating system kernel 201 as required. In particular, database tables 220-222 are typically too large to be completely loaded into memory, and typically only a portion of the total number of database records is loaded into memory at any one time. The full database 203 is typically recorded in storage devices 125-128. Furthermore, the conceptual memory representation of FIG. 2 might represent a single logical partition of a computer system having multiple logical partitions. Finally, it will be understood that the conceptual representation of FIG. 2 is not meant to imply any particular memory organizational model, and that system 100 might employ a single address space virtual memory, or might employ multiple virtual address spaces which overlap.

Autonomic Regulation of Volatility Attributes

In one or more preferred embodiments, a volatility monitor function 207 within database manager 205 periodically automatically captures certain measures of table volatility over a sampling interval and computes a volatility ratio for the interval as an approximate measure of volatility. Values representing table volatility state are automatically updated based on these computations, so that the user is not required to manually determine and specify table volatility. Although the technique of automatically determining database volatility attributes as described herein is a preferred technique for establishing database table volatility, it will be understood that other or alternative automated, partially automated, or non-automated techniques could be used, and that in particular a database administrator or similar person could manually specify the volatility attributes of one or more tables.

Table volatility state can be used in any of various ways to improve system performance and/or utilization of system resources. Instead of or in addition to using the volatility state of a table to determine an optimum query execution strategy for a query involving data in the table, database table volatility state is preferably used for one or more of the following: (a) for selecting a storage device for storing certain database table data; (b) for determining whether to create and/or maintain one or more MQT's; and (c) for providing guidance regarding the use of indexes and recommending that indexes be created, or for automatically creating and maintaining indexes. Additionally, database table volatility state may optionally be used for preferentially retaining in memory certain pages from volatile database tables, and/or for automatically adjusting the extension file size of certain database tables. In general, these different uses are independent, and any one, or some, or all of these might be employed in the same database system. Certain exemplary embodiments of these various uses are described further herein.

Figure 5A:
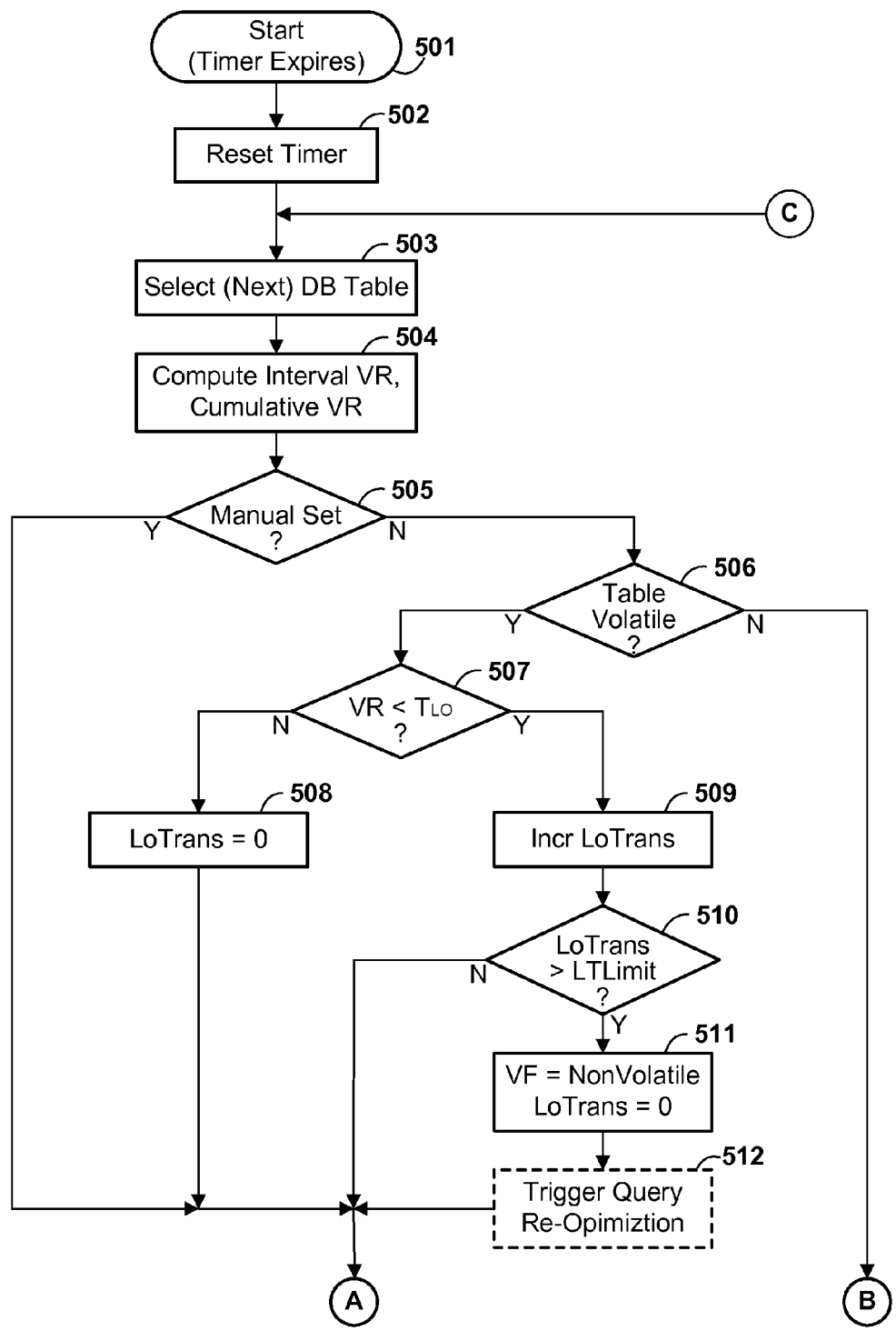
FIGS. 5A and 5B (herein collectively referred to as FIG. 5) are a flow diagram illustrating at a high level the process updating volatility state data at sampling intervals, according to one or more preferred and/or optional embodiments.
Figure 5B:
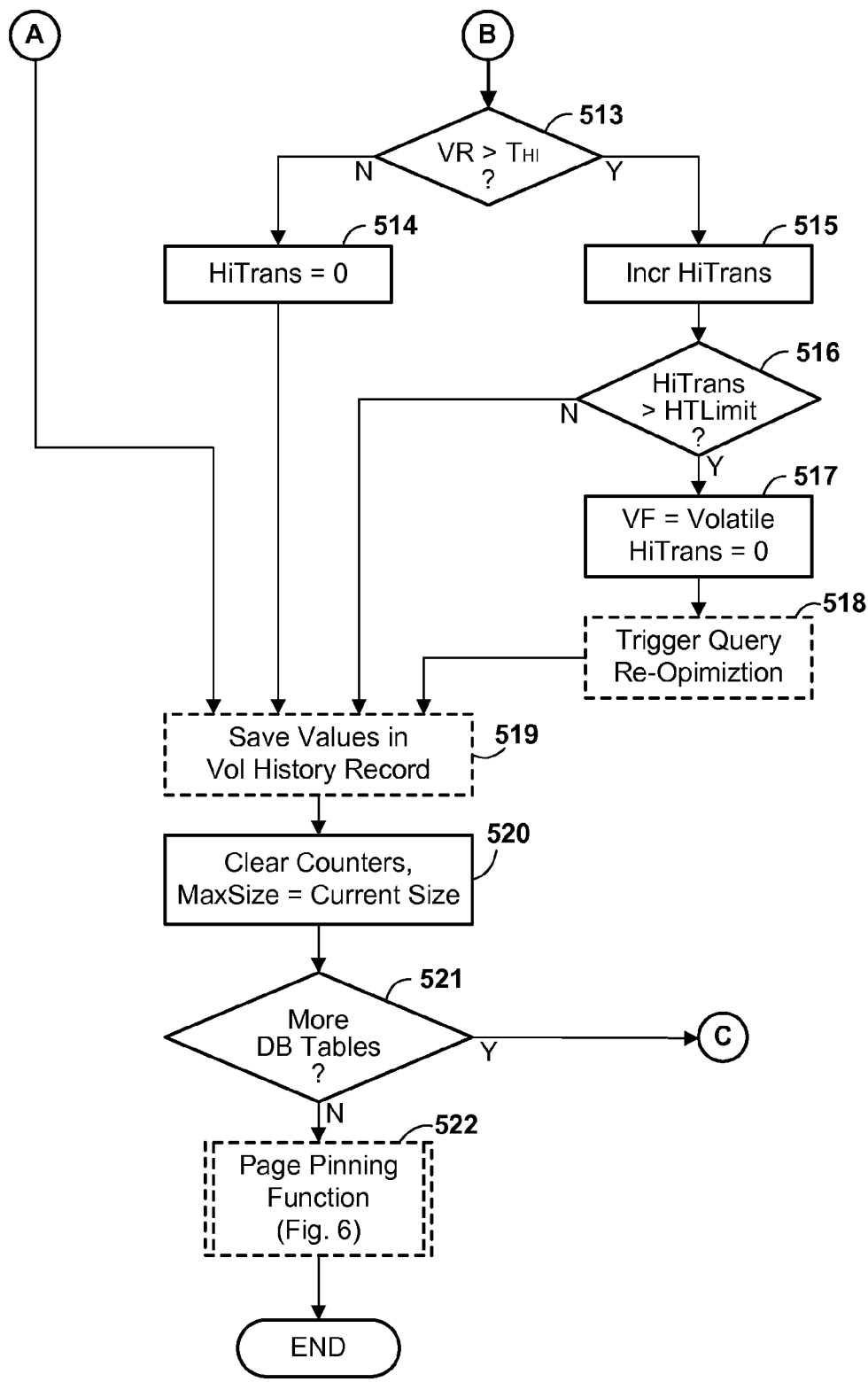

FIG. 5 is a flow diagram illustrating at a high level the process updating volatility state data at sampling intervals, according to the preferred embodiment. Referring to FIG. 5, the process is triggered by expiration of a sampling timer (block 501), which causes sampling data to be saved and volatility state updated. The sampling interval is preferably one minute, it being recognized that longer or shorter intervals could alternatively be used. Upon triggering volatility state update, the sampling timer is reset (block 502) to enable triggering the next sampling interval update.

A (next) database table 220-222 is selected for updating volatility state (block 503). A volatility ratio of the selected table in the sampling interval just concluded (the "interval volatility ratio") and a cumulative volatility ratio, representing a volatility ratio over time which is adjusted with each sampling interval, are computed (block 504).

The interval volatility ratio is computed as:

$$\text{IntervalVR} = [K_1 * (\text{Inserts}) + K_U * (\text{Updates}) + K_D * (\text{Deletes})] / \text{MaxSize}, \quad (1)$$

where Inserts, Updates, and Deletes are the number of record insert operation, update operations, and record delete operations, respectively, performed on the subject table during the sampling interval just concluded, MaxSize is the maximum size, in number of records, of the table during the sampling interval, and $K_1$, $K_U$ and $K_D$ are appropriately chosen coefficients. Inserts, Updates, Deletes and MaxSize are taken directly from the corresponding fields of header 301. The coefficients $K_I$, $K_U$ and $K_D$ could all be the same, but in the preferred embodiment are weighted differently. In general, Inserts and Deletes are weighted more heavily than Updates, and Inserts more heavily than Deletes. In a further alternative embodiment, some updates could be weighted more heavily than others. For example, updates that affect a key value could be weighted more heavily than updates which do not (this would require the maintenance of one more additional field (not shown) in header 301 to count updates affecting the key value). An exemplary set of coefficients might be, for example, 2.0 for Inserts, 0.9 for Deletes, 2.0 for updates that affect a key in an index, and 0.3 for other updates.

The value of an interval volatility ratio which might indicate a "volatile" table will depend on the database environment, but for a sampling interval of one minute, a volatility ratio of 0.1 or greater in a large table (e.g., more than 3000 records, or more than 5000 records) would typically indicate a volatile table. This threshold might be adjusted upward for relatively small tables. For example, for a table of 100 records a volatility ratio of 2 or greater might indicate volatility, and for a table of 1000 records a volatility ratio of 0.25 might indicate volatility. It will be understood that these values are merely representative examples, and could vary depending on many environmental factors. Furthermore, since the volatility ratio as described in formula (1) above involves a count of certain events taking place during the sampling interval, it will be expected that volatility ratio will vary with the length of the sampling interval.

In one or more variations, the interval volatility ratio is normalized to a floating point value between 0 and 1. For example, interval volatility ratio may be normalized according to:

$$\text{IntervalVR(Normalized)} = \text{IntervalVR}/(\text{IntervalVR} + M_V), \quad (2)$$

where $M_V$ is an appropriately chosen mid-point value yielding a normalized IntervalVR of 0.5. For example, $M_V$ might equal 0.1 (for a large table and a one minute sampling interval, as discussed above. It will be appreciated that any of various alternative normalization formulae could be used.

Since it is expected that there will be some variation in database activity, volatility is preferably determined based on data from multiple recent intervals. This could be done in any number of ways. For example, if more than half (or some other percentage) of a set of recent intervals (e.g., the last 30 one-minute intervals) have interval volatility ratios exceeding a threshold, then the table might be considered volatile. Alternatively, if some number of consecutive recent intervals have volatility ratios exceeding a threshold, then the table might be considered volatile. To avoid excessive oscillation between a volatile and non-volatile state, a first threshold may be used for switching from non-volatile to volatile, and a second, lower, threshold may be used for switching from volatile to non-volatile.

In one or more embodiments, a cumulative volatility ratio, representing a form of average of recent intervals, is computed from the interval volatility ratios (as described in formula (1) or (2) above), adjusted after each interval as follows:

$$\text{CumVRNew} = (1-tv)^*\text{CumVROld} + tv^*\text{IntervalVR}, \quad (3)$$

where CumVRNew is the new cumulative volatility ratio (after adjustment), CumVROld is the previous cumulative volatility ratio (before adjustment), and tv is an appropriately chosen time constant of volatility between 0 and 1, used to average the IntervalVR just computed and the old cumulative volatility ratio. The time constant of volatility controls the rate at which volatility from previous intervals is aged, a larger value of tc resulting in faster aging of data. If the Interval VR is normalized, then the normalized value of IntervalVR is used in the above equation to generate a normalized cumulative volatility ratio.

The volatility ratios as herein described are intended as a relatively simple measure of table volatility, which can be computed using numerical inputs which are either already likely to be available or are relatively easy to obtain, e.g. by counting certain events. It will be appreciated that any of various alternative techniques utilizing alternative inputs could be used. For example, rather than be based on a single formula which computes a volatility ratio or other figure of merit, volatility may be determined by making a set of comparisons of measured or derived values to pre-determined thresholds. Other or additional inputs may be used; for example, a difference between the maximum size of the table and the minimum size of the table in the sampling interval could be considered.

As a further alternative, a volatility ratio or other figure of merit or technique for determining volatility could be applied separately to each partition 302 of a partitioned database table. In accordance with this further alternative, sampling data such as a number of inserts, updates, and deletes, a maximum size, and so forth, could be maintained separately for each partition, and the volatility ratio computed accordingly. Any function which depends on volatility attributes could then operate independently for different partitions of a table. For example, the query optimizer 209 could optimize a query separately for different partitions depending on volatility. As another example, memory pages from volatile partitions might be preferentially retained in memory, while pages from non-volatile partitions are not. As another example, the extension file size might vary depending on the partition which is being added to and the volatility of that partition. As a further example, data in volatile partitions may be stored in a storage device preferred for volatile data, while data from non-volatile partitions is stored in a different storage device. In these and other embodiments, it will be understood that certain fields shown in header 301 would be replicated for each table partition for which volatility is separately determined and used to manage aspects of the partition.

As a further alternative, certain volatility data could be maintained separately for each field of a database table. Specifically, the number of update operations could be maintained separately for each field (there is no need to maintain inserts/deletes separately). A separate volatility measure for each field might be useful, for example in determining whether to maintain a materialized query table and/or determining whether to maintain an index, as disclosed further herein.

As a further alternative, a volatility ratio or other figure of merit may be based on a number of bytes inserted, changed, or deleted, rather than a number of insert, update or delete operations, either alone or in combination with other factors. For example, if the database contains a large object (LOB) column, such as a binary large object (BLOB) or a character based large object (CLOB), and the sizes of the entries varies drastically between inserts, updates and deletes, that table may be considered volatile even though the number of records changed may not be extraordinary. For example, a volatility ratio may be a number of bytes inserted+updated+deleted divided by a maximum table byte size, or the number of bytes inserted, updated and deleted, multiplied by a suitable coefficient $K_B$, may be an additional term in the volatility ratio computed as described in formula (1) above.

Furthermore, a figure of merit for volatility, such as a volatility ratio, could take into account the variation in system workload which typically occurs at different days and times. For example, volatility ratio might only be computed for peak times, so that very low volatility occurring when the system is lightly used is not taken into account. The volatility might be additionally normalized based on average number of transactions occurring per unit time, or some other measure of activity. Finally, extremely high volatility occurring during an interval in which a database is being initially loaded, copied, or populated with data might be ignored for purposes of determining volatility.

If the manual set flag 310 in table header 301 is true, then the 'Y' branch is taken from block 505, and blocks 506-518 are by-passed. In this case, the manual set flag indicates that the user will manually set the volatile flag, and the database manager therefore does not alter it. It will be noted, however, that the database manager still computes and saves the volatility ratios (as described above), since this data may be useful for later performance analysis or if the user should decide to activate automated setting of volatility state. If manual set flag 310 is false, the 'N' branch is taken from block 505 to block 506.

If the subject database table is currently considered 'volatile', i.e. the volatile flag 309 in header 301 is set to 'volatile', then the 'Y' branch is taken from block 506. In this case, the volatility monitor considers whether the volatile flag should be changed. The volatile flag will be switched to a 'non-volatile' state if the volatility ratio or other measure of volatility remains below a pre-determined low threshold ($T_{LO}$) for more than a pre-determined number of sampling intervals (LTLimit). In one or more embodiments, this volatility ratio is the cumulative volatility ratio computed according to formula (3); in other embodiments, it may be the interval volatility ratio according to either formula (1) or (2); in still other embodiments, it might be some other measure of volatility. Referring to FIG. 5, if the volatility ratio or other measure of volatility, as described above, is not below the low threshold $T_{LO}$, then the 'N' branch is taken from block 507, and a counter LoTrans, which counts the number of consecutive sampling intervals in which the volatility ratio or other measure of volatility remains below the low threshold $T_{LO}$, is reset to 0 (block 508). If, at block 507, the volatility ratio or other measure of volatility is below $T_{LO}$, then the 'Y' branch is taken from block 507, and the counter LoTrans is incremented by one (block 509). The counter LoTrans is then compared with the limit LTLimit (block 510). If the counter LoTrans does not exceed the limit LTLimit, the 'N' branch is taken from block 510, skipping blocks 511-512. If the counter LoTrans exceeds the limit LTLimit, then the state of the volatile flag is switched to 'non-volatile', and the counter LoTrans is reset to 0 (block 511). The change in volatility state could optionally be cause for triggering re-optimization of saved query strategies which reference data in the subject database table, represented as block 512 in dashed lines. Program flow then continues to block 519, where state values are saved.

If, at block 506, the subject database table is not currently considered 'volatile', i.e. the volatile flag 309 in header 301 is set to 'non-volatile', then the 'N' branch is taken from block 506. In this case, the volatility monitor considers whether the volatile flag should be changed to 'volatile'. The volatile flag will be switched to a 'volatile' state if the volatility ratio or other measure of volatility, as described above, remains above a pre-determined high threshold ($T_{HI}$) for more than a pre-determined number of sampling intervals (HTLimit). Referring to FIG. 5, if the volatility ratio or other measure of volatility is not above the high threshold $T_{HI}$, then the 'N' branch is taken from block 513, and a counter HiTrans, which counts the number of consecutive sampling intervals in which the volatility ratio or other measure of volatility remains above the high threshold $T_{HI}$, is reset to 0 (block 514). If, at block 513, the volatility ratio or other measure of volatility is above $T_{HI}$, then the 'Y' branch is taken from block 513, and the counter HiTrans is incremented by one (block 515). The counter HiTrans is then compared with the limit HTLimit (block 516). If the counter HiTrans does not exceed the limit HTLimit, the 'N' branch is taken from block 516, skipping blocks 517-518. If the counter HiTrans exceeds the limit HTLimit, then the state of the volatile flag is switched to 'volatile', and the counter HiTrans is reset to 0 (block 517). The change in volatility state could optionally be cause for triggering re-optimization of saved query strategies which reference data in the subject database table, represented as block 518 in dashed lines. Program flow then continues to block 519, where state values are saved.

While it would be possible to set $T_{LO}=T_{HI}$ and LTLimit=HTLimit=0, in the preferred embodiment $T_{LO}<T_{HI}$ and both LTLimit and HTLimit are greater that zero to reduce oscillation between the volatile and non-volatile state where table volatility hovers in the middle of the range.

After making any required state changes to the volatile flag, the sampled and calculated values for the sampling interval just concluded are saved in volatility history record 230 (block 519), i.e. the entry 401 in volatility history record 230 is updated with event counts and so forth from the sampling interval just concluded, or if necessary an new entry 401 is created in the volatility history record table and populated with data from the sampling interval. In this case, the interval volatility ratio 407 could be the interval volatility ratio for the sampling interval just concluded, plus any other included sampling intervals, computed as described above in formula (1) or (2), and the volatility ratio 406 could be the cumulative volatility ratio adjusted as described above by interval volatility ratio. Block 519 is shown in dashed lines to indicate that this step is only performed if optional volatility history record 230 is maintained.

The volatility monitor then clears the counters for inserts 315, updates 316, and deletes 317 in table header 301, and initializes MaxSize 314 to the current size of the subject database table (block 520). If more database tables remain to be processed, the 'Y' branch is taken from block 521, and a next database table is selected for processing at block 503. When all database tables have been processed for the sampling interval just concluded, the 'N' branch is taken from block 521.

In one or more embodiments, one or more additional functions as described below may be triggered when volatility state data is updated at sampling intervals. These functions may include: page pinning function 211 for preferentially retaining in memory certain pages from volatile database tables, represented if FIG. 5 as optional block 522, and shown in greater detail in FIG. 6. Other or additional functions may also be performed at this time. Updating of volatility state data provides a convenient time to perform these functions; however, it is not strictly necessary that these additional functions be performed when volatility state data is updated, and they could alternatively be performed independently and asynchronously with the updating of volatility state data.

After all database tables have been processes and any optional functions invoked, the process of updating volatility state data at sampling intervals goes to sleep until the timer expires again.

Preferentially Retaining Volatile Table Pages in Memory

Figure 6A:
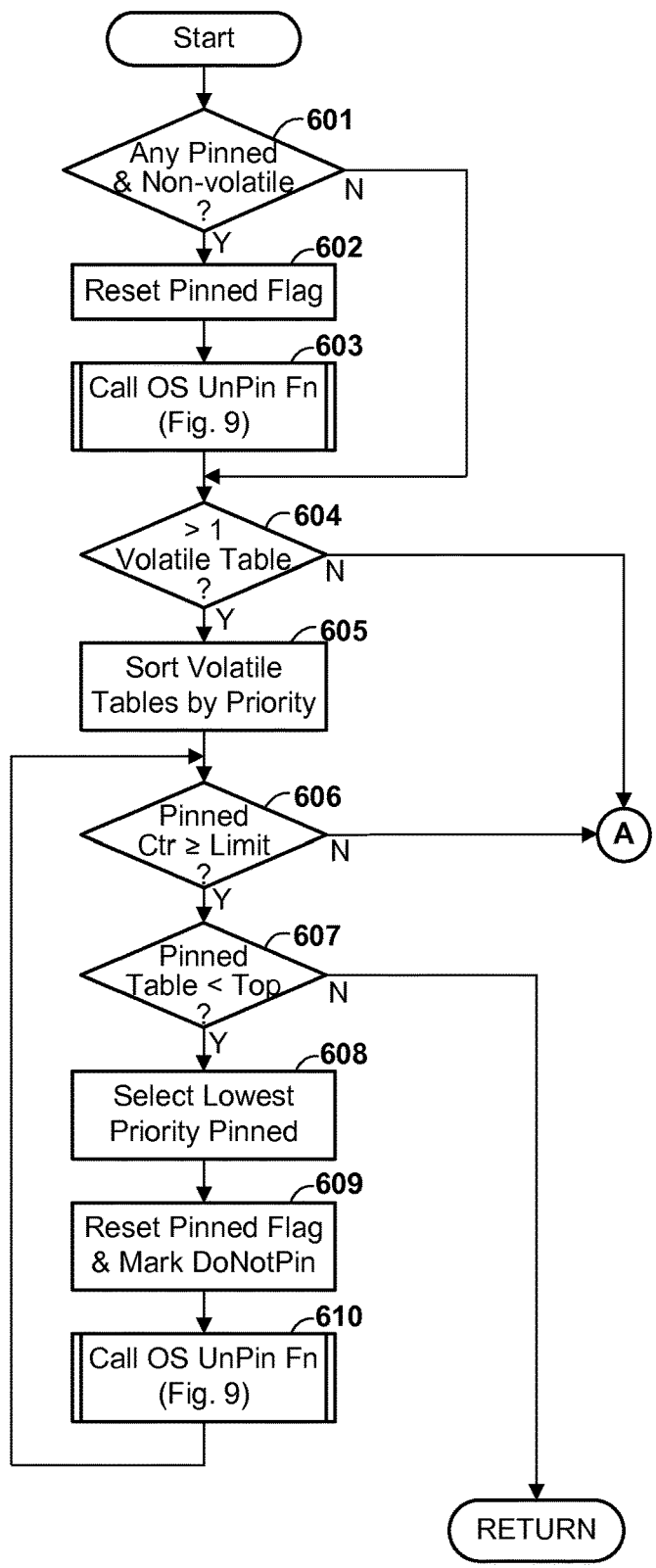
FIGS. 6A and 6B (herein collectively referred to as FIG. 6) are a flow diagram illustrating the operation of a page pinning function in a database manager which causes certain pages from volatile database tables to be preferentially retained in memory, specifically by pinning, according to one or more optional embodiments.
Figure 6B:
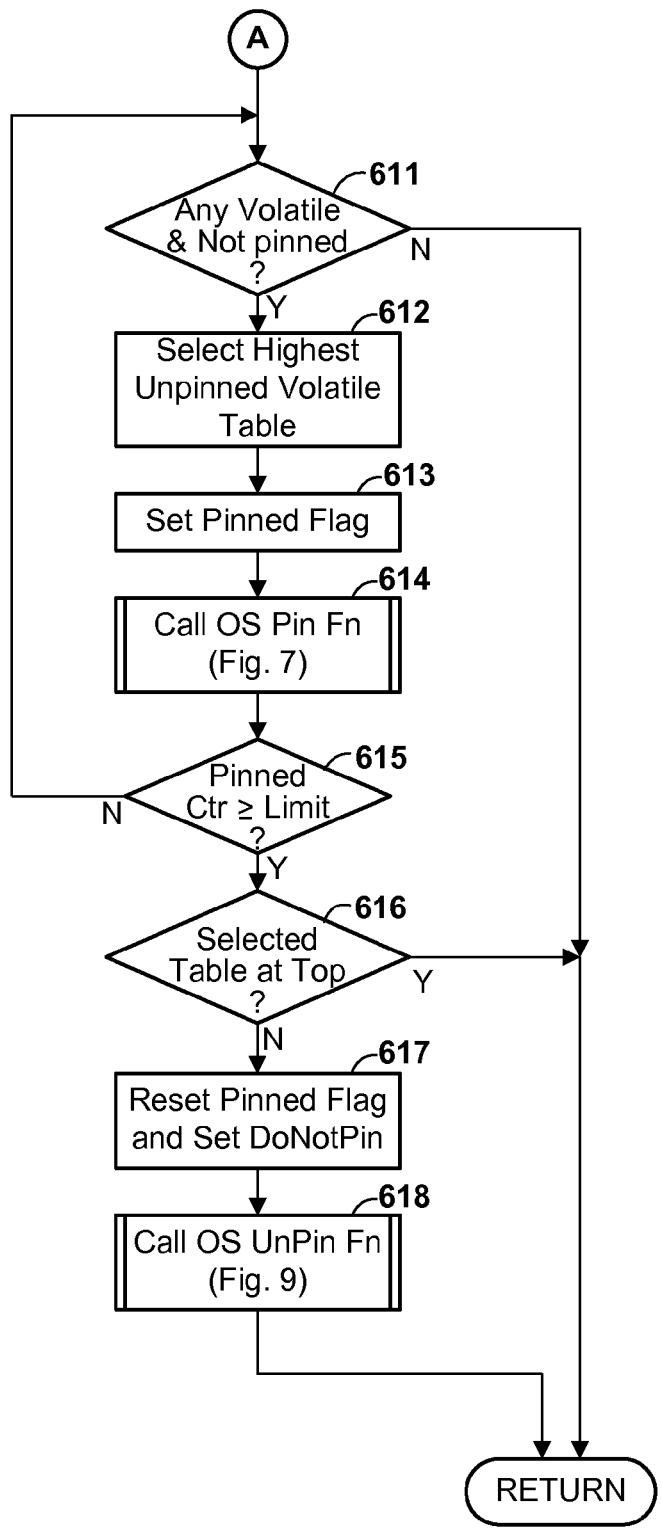
Figure 7:
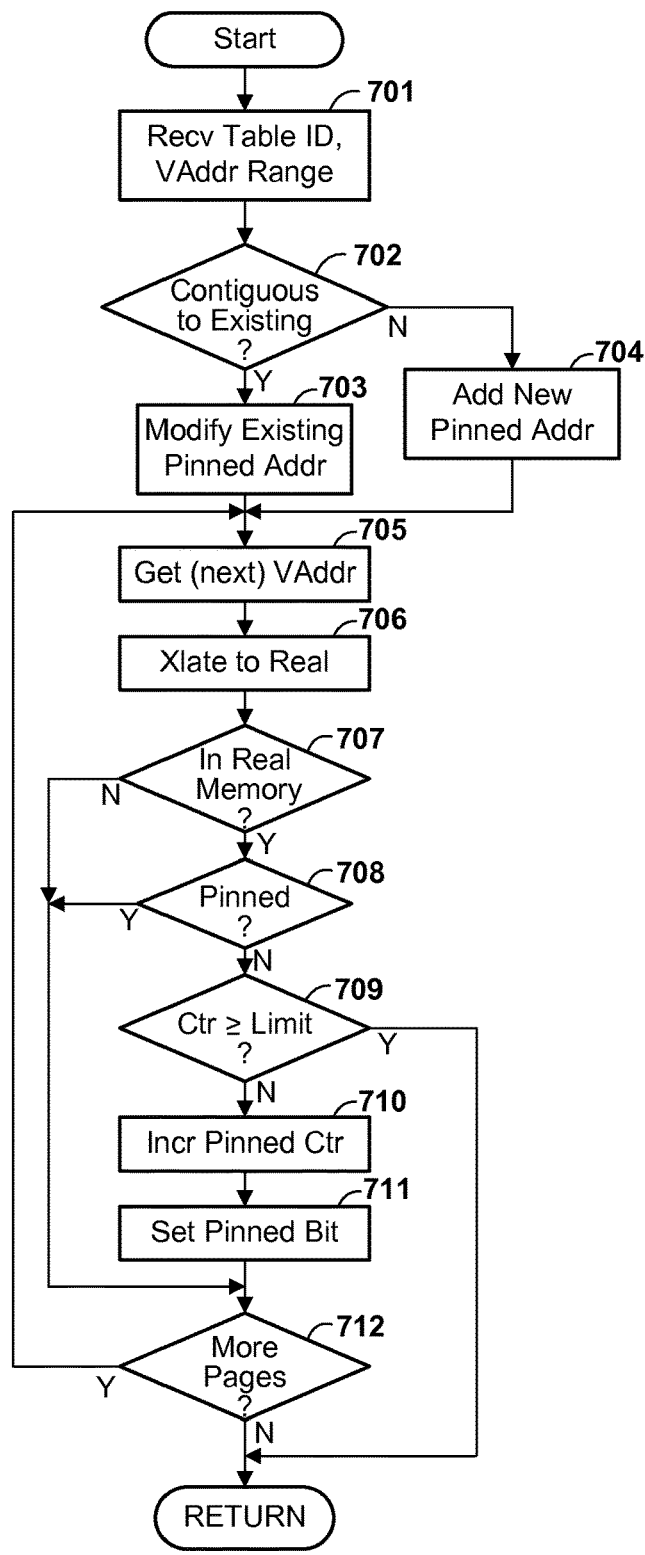
FIG. 7 is a flow diagram illustrating an operating system process of pinning memory associated with a volatile database table, according to one or more optional embodiments.
Figure 8:
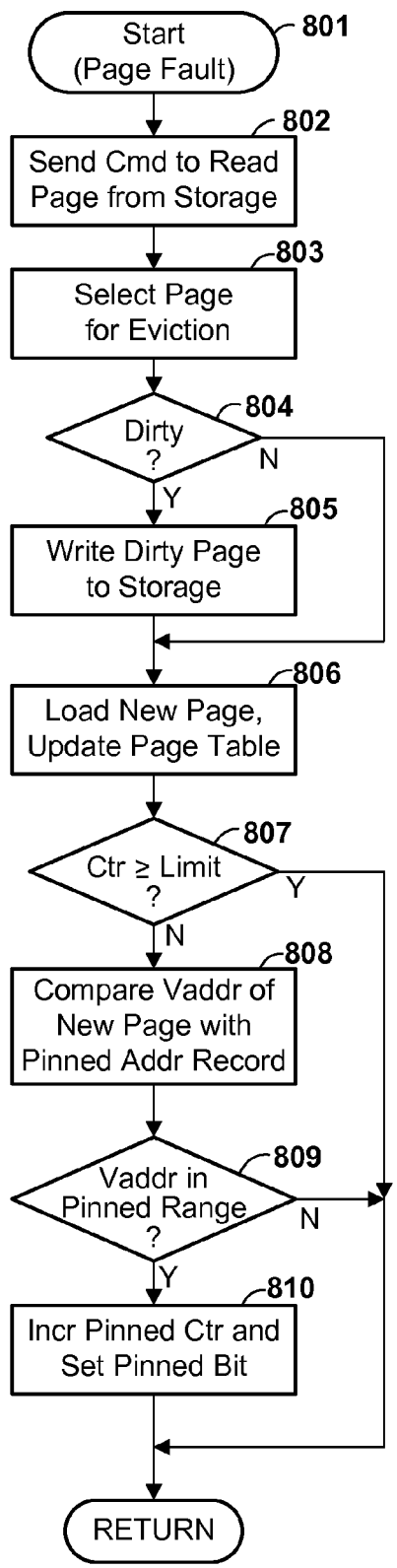
FIG. 8 is a flow diagram illustrating an operating system process of loading a new page in memory, according to one or more optional embodiments.
Figure 9:
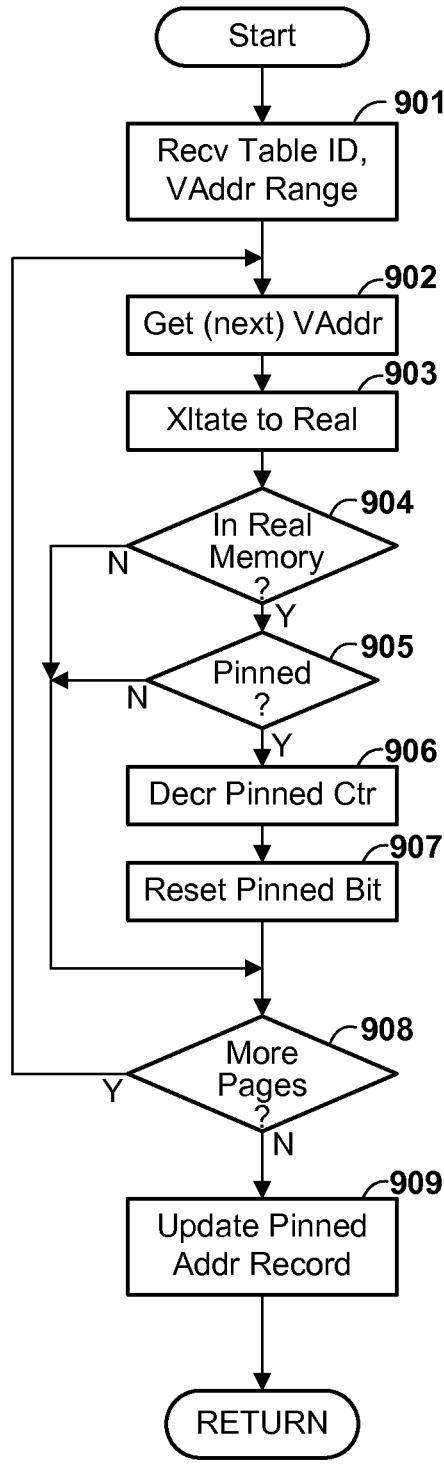
FIG. 9 is a flow diagram illustrating an operating system process of unpinning previously pinned memory pages, according to one or more optional embodiments.

As explained previously, in one or more optional embodiments a volatility attribute associated with a database table is used to pin or otherwise preferentially retain pages in memory holding data from the table. Pinning is preferably accomplished by calling a page pinning function 211 in the database manager, which in turn may call appropriate pinning or unpinning routines in page manager 216. FIG. 6 is a flow diagram illustrating the operation of page pinning function 211 in database manager 205 which causes certain pages from volatile database tables to be preferentially retained in memory, specifically by pinning. FIG. 7 is a flow diagram illustrating an operating system process of pinning memory associated with a volatile database table, which may be called from the database manager's page pinning function 211 responsive to a change in volatility state of a database table from 'non-volatile' to 'volatile'. This operating system process may also be called if additional records are allocated to an existing volatile database table. FIG. 8 is a flow diagram illustrating an operating system process of loading a new page in memory responsive to a page fault occurring in any process executing on the computer system. FIG. 9 is a flow diagram illustrating an operating system process of unpinning previously pinned memory pages, which may be called from the database manager's page pinning function 211 responsive to a change in volatility state of a database table from 'volatile' to 'non-volatile', or to free up previously pinned pages when the number of pinned pages has reached a limit.

In one or more embodiments, page pinning function 211 is triggered periodically, such as when volatility state is updated, to pin or unpin pages according to current volatility of database tables. Page pinning function 211 may further be invoked when additional records (i.e., virtual addresses) are allocated to an existing volatile table. Operation of the page pinning function is shown in FIG. 6.

Referring to FIG. 6, if there are any pinned database tables (or partitions of a database table for which volatility is separately determined) which are non-volatile, for each such table or partition, the 'Y' branch is taken from block 601, the pinned flag is reset in the table header (or header for a partition of a table) (block 602), and the operating system's unpin function is called to unpin the corresponding segment(s) of virtual memory, shown as block 603 in FIG. 6, and illustrated in greater detail in FIG. 9. If there are no such tables (or partitions), blocks 602 and 603 are skipped.

If there is more than one volatile database table (or partition of a database table for which volatility is separately determined), the 'Y' branch is taken from block 604. In this case, the volatile tables (or partitions) are sorted by pinning priority (block 605). Preferably, the number of pinned pages is limited by the operating system to prevent excessive pinning of pages in memory, to the point where so many pages may be pinned that available memory for other uses is constrained and performance is adversely affected. If there is more than one volatile database table, there exists the possibility that multiple tables will compete for a limited capacity of pinned pages. It is therefore desirable to assign a pinning priority to each database table (or partition), so that if pinning is constrained, the highest priority pages will be pinned.

Any of various techniques or formulae could be used to determine a pinning priority for the database tables or partitions, as represented by block 605. In one embodiment, priority is in reverse order of table or partition size, meaning that the smallest tables or partitions have the highest priority for pinning. This embodiment may in particular be preferable where the only volatility state data is binary (each entity is either volatile or non-volatile), which could be either manually entered state data or state data which is algorithmically determined by the computer. Where volatility state includes a quantitative expression of volatility, such as a volatility ratio as described above, priority could be based on the degree of volatility or a combination of table/partition size and degree of volatility. For example, a priority may be determined by computing a figure of merit weighted between a normalized table/partition size and a normalized cumulative volatility ratio (CumVR), computed in accordance with formula (3) above from an interval volatility ratio normalized according to formula (2) above, as follows:

$$\text{Priority} = W_S * [M_S/(\text{Size}+M_S)] + W_V * \text{CumVR}, \quad (4)$$

where $M_S$ is an appropriately chosen mid-point value of table/partition size yielding a normalized size factor of 0.5, and $W_S$ and $W_V$ are weighting coefficients for the normalized size factor and the normalized cumulative volatility ratio, respectively. For example, typical values of these coefficients might be a mid-point of table/partition size ($M_S$) of 150 pages, a size weight ($W_S$) of 0.4, and a cumulative volatility ratio weight ($W_V$) of 0.6. It will be appreciated, however, that these are merely exemplary values, and could vary considerably depending on the system environment. Any or all of these values could be configurable. In particular, the mid-point of table/partition size ($M_S$) may be dependent on the amount of memory in the system. This could be computed (either automatically or manually) by determining an amount of memory available for pinning (in pages) divided by the number of file entities (tables or partitions) subject to pinning. An amount of memory available for pinning could be, e.g., a percentage of total system memory or a percentage of total system memory less some reserved memory for OS functions. Where memory within the system is logically partitioned, the available memory might be a percentage of memory in the logical partition in which the database executes.

If a pinned page counter has reached a pinned page limit, the 'Y' branch is taken from block 606, and the pinning function will attempt to free up some pinned pages at blocks 607-610. The pinned page counter is maintained by the operating system, and its value is accessed by an operating system call. If the pinned page counter has not reached the limit, control proceeds to block 611.

If, at block 607, there is no pinned database table other than the highest priority volatile table, then unpinning the only pinned table will not enable a higher priority table to be pinned, and the 'N' branch is taken to return. Otherwise, the 'Y' branch is taken from block 607, and the lowest priority pinned table is selected (block 608). The pinned flag 318 in the header of the selected table is reset, and the selected table (and any tables of lower priority) is/are marked "do not pin" (block 609). The table is marked "do not pin" at block 609, and optionally at block 617, to prevent repetitive pinning and unpinning of the same table, and it should be understood that this designation is temporary. In one or more embodiments, the "do not pin" restriction has a duration of only the current call to the page pinning function. In other embodiments, it may survive some time interval, such as five volatility data sampling intervals.

The database manager's pinning function then calls an operating system "UnPin" function to unpin pages in the selected table; this process is shown in FIG. 6 as block 610, and described in greater detail in FIG. 9. When the OS UnPin function returns, control proceeds to block 606.

If, at block 606, the pinned page counter is less than the pinned page limit, then there is additional pinned page capacity which could be utilized by pinning another volatile table, if one exists. Accordingly, following the 'N' branch from block 606, the pinning function determines whether there is at least one database table which is volatile, which is unpinned, and which has not been marked "do not pin" (block 611). If not such table exists, the 'N' branch is taken from block 611 and the page pinning function returns. If such a table exists (the 'Y' branch from block 611), the page pinning function will attempt to pin its pages.

The highest priority unpinned volatile table is selected for pinning (block 612). The pinned flag 318 in the table's header is set (block 613). The database manager's pinning function calls an operating system "Pin" function to pin pages of the selected table in memory; this process is shown in FIG. 6 as block 614, and described in greater detail in FIG. 7.

If a pinned page counter has reached a pinned page limit, the 'Y' branch is taken from block 606, and the pinning function will attempt to free up some pinned pages at blocks 607-610. The pinned page counter is maintained by the operating system, and its value is accessed by an operating system call. If the pinned page counter has not reached the limit, control proceeds to block 611.

Upon return from the operating system "Pin" function, if the pinned page counter has not reached the pinned page limit, the 'N' branch is taken from block 615, and control returns to block 611 to determine whether there are any more tables that might be pinned. If the pinned page counter has reached the pinned page limit, the 'Y' branch is taken to block 616. In this case, if the selected database table which was just pinned is the highest priority table, no further unpinning will be attempted, and the 'Y' branch is taken from block 616 to return. Otherwise, the 'Y' branch is taken from block 616, and the pinned flag 318 in the header of the selected table is reset, and the selected table (and any tables of lower priority) is/are marked "do not pin" (block 617). The database manager's pinning function then calls an operating system "UnPin" function to unpin pages in the selected table; this process is shown in FIG. 6 as block 618, and described in greater detail in FIG. 9. When the OS UnPin function returns, the database manager's pinning function returns.

The operating system's "Pin" function is illustrated in FIG. 7. Referring to FIG. 7, when database manager 205 calls the operating system Pin function, it passes the virtual address range to be pinned (e.g., the virtual address range of a database table), which is received by the OS Pin function (block 701). If the subject database table is allocated to multiple non-contiguous address ranges, the pinning function may be called separately for each address range. The OS Pin function accesses pinned address table 218 to determine whether an entry already exists in the pinned address table which is contiguous to the address range to be pinned (block 702). If an entry already exists which is contiguous, the entry in pinned address table 218 is extended to include the current address range to be pinned (block 703). If the database table entry does not already exist, a new entry is added to address table for the address range to be pinned (block 704).

The OS Pin function then attempts to pin each page of the virtual address range that was just added to the pinned entries which is currently in memory. A virtual address of a page is selected (block 705), and the OS Kernel attempts to translate it to a real address using page table 217 (block 706). If the virtual address can not be translated to a real address (i.e., the page is not in real memory), the 'N' branch is taken from block 707 to block 712, skipping blocks 708-711. If the virtual address translates to a real address, meaning the page is in memory, the 'Y' branch is taken from block 707. In this case, if the pinned bit is already set for the corresponding page in the page table, the 'Y' branch is taken from block 708 to block 712, skipping blocks 709-711. If the pinned bit is not set for the corresponding page in the page table (the 'N' branch from block 708), the page pinning function checks whether a pinned page counter is equal to or exceeds a pinned page limit (block 709). The pinned page limit which is checked at block 709 is intended to prevent excessive pinning of pages. If the counter equals or exceeds the limit (the 'Y' branch from block 709), no further pages are pinned, and the OS Pin function returns. If the limit is not reached, the 'N' branch is taken from block 709, the pinned page counter is incremented (block 710), and the pinned bit is set for the corresponding page in the page table (block 711). If more pages remain in the virtual address range to be pinned, the 'Y' branch is taken from block 712, and a next virtual page address is selected at block 706. When all pages in the virtual address range have been examined, the 'N' branch is taken from block 712, and the OS Pin function returns.

In the implementation described above with respect to FIG. 7, the addition of a virtual address range to addresses to be pinned causes the subject virtual addresses to be examined and pages currently in memory corresponding to those addresses to be pinned at blocks 705-712. However, it would alternatively be possible to do nothing to change the pinned bits of pages already in memory, and pin appropriate pages as they are loaded into memory responsive to page faults, as described below with respect to FIG. 8.

The pinned bit is also set as required as each new page is loaded into memory. An operating system process of loading a new page in memory responsive to a page fault is shown in FIG. 8. Referring to FIG. 8, the operating system's paging function is triggered by a page fault when attempting to access a specific virtual address (block 801). A command is sent to the storage device to retrieve the required page (block 802). While the command is pending, a page currently in memory is selected for eviction, using any appropriate selection technique now known or hereafter developed (block 803). In selecting a page for eviction, any page which is "pinned" (the pinned bit is set) is exempted from eviction. If the "dirty" bit of the page selected for eviction is set (the 'Y' branch from block 804), the page to be evicted is written to storage (block 805); otherwise block 805 is skipped. The new page is loaded into memory when retrieved from storage, and the page table is updated (block 806)

The operating system checks the value of the pinned page counter. If the counter is greater than or equal to the pinned page limit, the 'Y' branch is taken from block 807, and blocks 808-810 are skipped. If the counter has not reached the limit (the 'N' branch from block 807), the virtual address of the new page in memory is compared with the entries in the pinned address record 218 to determine whether the new page lies within a memory range which should be pinned (block 808). If the virtual address of the new page lies within a pinned address range, the 'Y' branch is taken from block 809, the pinned page counter is incremented, and the pinned bit for the new page in page table 218 is set (block 810). If the virtual address of the new page is not within a pinned address range, block 810 is skipped. The operating system process for loading a new page then returns.

An operating system process unpins previously pinned memory pages within a specified virtual address range. This process may be called responsive to a change in volatility state of a database table from 'volatile' to 'non-volatile', or to free up previously pinned pages because too many pages are pinned, or for some other reason. FIG. 9 is a flow diagram illustrating such an operating system process.

Referring to FIG. 9, an operating system "UnPin" function receives a virtual address range to be unpinned, such as the virtual address range of a database table (block 901). The OS UnPin function unpins each page of the received virtual address range. A virtual address of a page is selected (block 902), and the OS Kernel attempts to translate it to a real address using page table 217 (block 903). If the virtual address can not be translated to a real address (i.e., the page is not in real memory), the 'N' branch is taken from block 904 to block 908, skipping blocks 905-907. If the virtual address translates to a real address, meaning the page is in memory, the 'Y' branch is taken from block 904. In this case, if the pinned bit is not set for the corresponding page in the page table, the 'N' branch is taken from block 905 to block 908, skipping blocks 906-907. If the pinned bit is set for the corresponding page in the page table (the 'Y' branch from block 905), the OS UnPin function decrements the pinned page counter (block 906), and resets the pinned bit for the corresponding page in the page table (block 907). If more pages remain in the virtual address range to be unpinned, the 'Y' branch is taken from block 908, and a next virtual page address is selected at block 902. When all pages in the virtual address range have been examined, the 'N' branch is taken from block 908. The OS UnPin function updates the pinned address record to remove the address range which was just unpinned (block 909), and returns.

In the implementation described above, pages containing data from a volatile database table are pinned, effectively preventing the pinned pages from being paged out of memory until the pin is released. However, table volatility could alternatively or additionally be used in other mechanisms which preferentially retain volatile table pages in memory, without pinning the pages to prevent paging out. One example of such an alternative mechanism, by no means exhaustive, would be to vary the initial and/or reset value of a recency counter associated with each page. Specifically, one known method of approximating a least recently used algorithm for selecting a page to evict from memory is to associate a recency counter with each page, which is initialized to a positive value when the page is first loaded into memory and decremented each time a new page is loaded from storage and an existing page evicted from memory. If a page is referenced while in memory, the counter is reset to its initial value. Pages which have reached a zero value are thus candidates for being paged out of memory. The counter for a page from a volatile table could be initialized and reset to a higher value, causing it to be retained in memory longer after it was last referenced. Other mechanisms could be used to preferentially retain volatile table pages in memory.

Adjusting Extension File Size of Database Tables Using Volatility

As noted above, in one or more optional embodiments a volatility attribute associated with a database table is used to automatically adjust a respective extension file size associated with each of one or more database tables. The extension file size is the amount of additional file space which is allocated to a database table when it is necessary to allocate additional space, such as when records are added to a database table to the point where all previously allocated space is used, and additional allocated space is needed for more records. There is typically a certain amount of fixed overhead involved in allocating additional file size to a database table, such as updating metadata, reserving areas of disk storage, and so forth. In general, it is more efficient to make fewer and larger allocations than more and smaller allocations, so when it is necessary to add space, it is common to add more than called for by the immediate requirements. Of course, space should not be allocated which won't be used, or won't be used for a very long time, so there is a design trade-off between allocation efficiency and avoiding excessive allocation. While in some systems a database administrator or other user can configure the extension file size, it is difficult for the user to know the optimal size or adjust size responsive to changing conditions.

In accordance with one or more optional embodiments, the database manager automatically determines an optimal file extension size for a database table, and in particular, uses the volatility of the table, among other attributes, to determine an optimal file extension size. Typically, a volatile table can be expected to change size more rapidly than a non-volatile table, and therefore the volatility of a database table is automatically used to adjust its extension file size, making larger allocations for more volatile tables.

Figure 10:
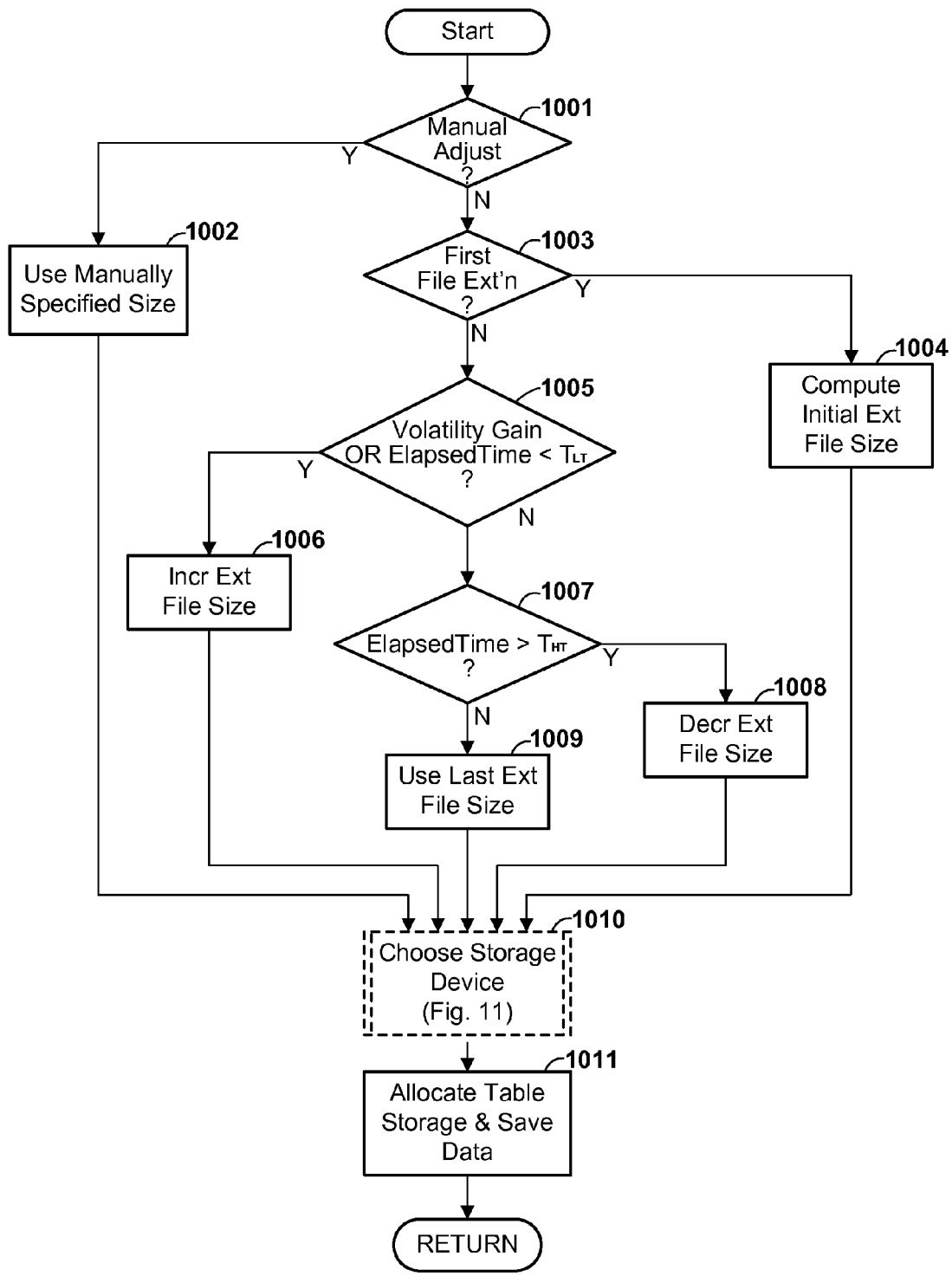
FIG. 10 is a flow diagram illustrating the operation of an extension file size adjustment function in a database manager which automatically adjusts extension file size, according to one or more optional embodiments.

FIG. 10 is a flow diagram illustrating the operation of an extension file size function 212 in database manager 205 which automatically adjusts extension file size of certain database tables, and in particular, uses table volatility as one parameter for determining an optimum extension file size, according to one or more optional embodiments. Preferably, the extension file size function 212 is triggered whenever it is necessary to allocate additional file space for a particular database table, but the process described below could alternatively be triggered (with some modifications) periodically or upon the occurrence of specific events which may affect the extension file size, such as an increase or decrease in table volatility. In the description below, an extension file size is determined for a database table, but it will be recognized that the same process could be used to determine an extension file size for a partition of a database table, a respective extension file size for each of multiple partitions in the database table being independently determined using parameters applicable to the corresponding partition.

Referring to FIG. 10, upon triggering the extension file size adjustment function responsive to a need for additional file space in the database table, the function checks whether a manual extension file size flag 319 is set in the header 301 of the corresponding database table. The flag is used to indicate that a system administrator, database administrator or other user will manually set the extension file size for the applicable database table, effectively disabling automatic adjustment. If the manual extension size flag 320 is set, the 'Y' branch is taken from block 1001, and the current extension file size (amount of additional file space to be allocated to the database file) is set to the value that was manually specified by the appropriate user as recorded in manual extension file size field 320 (block 1002), and control proceeds to block 1010. If the manual extension size flag 320 is not set, then automatic adjustment is indicated, and the 'N' branch is taken from block 1001.

If this is the first time (after file creation) that additional space has been allocated to the applicable database table, then the 'Y branch is taken from block 1003, an initial value for the automatically adjusted extension file size is computed (block 1004), and control proceeds to block 1010. This initial value could take into account any of several parameters, and in particular, in one or more embodiments is dependent on the volatility of the table or some component of table volatility, such as a number of record inserts or a number of record inserts less a number of record deletes during a recent time period. For example, in one embodiment, where a binary volatility attribute is used (table is either 'volatile' or 'non-volatile'), extension file size can be increased by a fixed multiplier for 'volatile' tables. A base extension file size can be computed as a fixed proportion of the current table size, such as 10% of the current size, and the base extension file size can be doubled (or increased by some other appropriate multiplier) if the table is 'volatile'. In another embodiment, where a volatility attribute is available as a quantitative value, such as a cumulative normalized floating point value between 0 and 1, computed according to equations (2) and (3), an initial extension file size can be computed as follows:

$$\text{ExtFileSize}=\text{TableSize}*(K_B + K_V*\text{NormalizedVolatility}) \quad (5)$$

where TableSize is the current size of the table and $K_B$ and $K_V$ are appropriately chosen coefficients. For example, $K_B$ could be 0.1, while $K_V$ could be the same as $K_B$, or could be a somewhat larger value, such as 0.2. Extension file size is preferably rounded to some convenient storage boundary, such as a page boundary.

For adjustments of the extension file size after an initial extension (the 'N' branch from block 1003, the extension file size adjustment function follows an incremental approach. The extension file size is incremented upwards if either (a) there was been a significant increase in volatility since the last increase in file size (indicating probable increased need for additional file space), or (b) the time elapsed since the last increase is below some threshold $T_{LT}$ (indicating current extension file size is too small). Condition (a) can be determined by comparing a current volatility attribute with the last extension volatility 323 in table header 301. If binary volatility attributes are used, an increase in volatility is a change from 'non-volatile' to 'volatile' state. If a quantitative value, such as a normalized value, is used, the two quantitative values are compared. For example, an increase of normalized volatility of 0.4 or greater might be considered a "significant increase" in volatility. Condition (b) is determined by comparing the current time with last extension time 321 in table header 301.

If either condition (a) or (b) above is met, the 'Y' branch is taken from block 1005, causing extension file size to be increased from the value last used to increase the extension file size, recorded in last extension file size 322 (block 1006), after which control proceeds to block 1010. The increase in extension file size performed at block 1006 could be a fixed increment (e.g., double the last extension file size), or could be determined by taking into account degree of volatility and/or time elapsed since last filed size increase. For example, a fixed increment such as double the last extension file size could be used as a default, but if the increase in volatility since the last increase in file size is more than some higher threshold such as 0.7, or the time elapsed since the last increase is less than $T_{LT}/2$ or some similar threshold, or if both increased volatility and low elapsed time are present, some further increment (e.g. qua-druple the last extension file size) could be made. A new extension file size could alternatively be computed algebraically by assigning appropriate weighting coefficients to a change in volatility and an elapsed time factor, e.g.:

$$\text{ExtFileSize}=\text{LastExtSize}*[1+K_{Time}*(T_{LT}-\text{ElapsedTime})/\text{ElapsedTime}+K_{Volatility}*\text{MAX}(\text{NormalizedVolatilityChange},0)] \quad (6)$$

where LastExtSize is the amount of file space added to the database file in the most recent extension, stored in field 322, ElapsedTime is the time elapsed since the most recent file extension, NormalizedVolatilityChange is the change in normalized volatility since the last file extension, and $K_{Time}$ and $K_{Volatility}$ are appropriately chosen weighing coefficients. Extension file size is preferably rounded to some convenient storage boundary, such as a page boundary.

If neither condition for increasing the extension file size is met at block 1005, the 'N' branch is taken. In this case, if the time elapsed since the last increase in table size is above some threshold $T_{HT}$, where $T_{HT}$ is significantly greater than $T_{LT}$, then the 'Y' branch is taken from block 1007, the extension file size is decremented (block 1008), and control proceeds to block 1010. $T_{HT}$ and $T_{LT}$ are pre-determined thresholds which are established such that the time interval range between $T_{HT}$ and $T_{LT}$ represents the preferred time interval for extending the file size of a database table. A time interval in excess of $T_{HT}$ since the previous increase in table size indicates that the extension size is too large and should be reduced. Extension size may be reduced by fixed percentage (e.g., half the last extension file size 322), or may be reduced by taking into account the actual time elapsed since the previous increase in table size, e.g., by reducing in larger increments for longer elapsed times.

If neither the conditions for increasing extension file size nor decreasing extension file size are met, the 'N' branch is taken from block 1007, and the last extension file size is used as the current extension file size (block 1009), and the database manager proceeds to block 1010.

Figure 11:
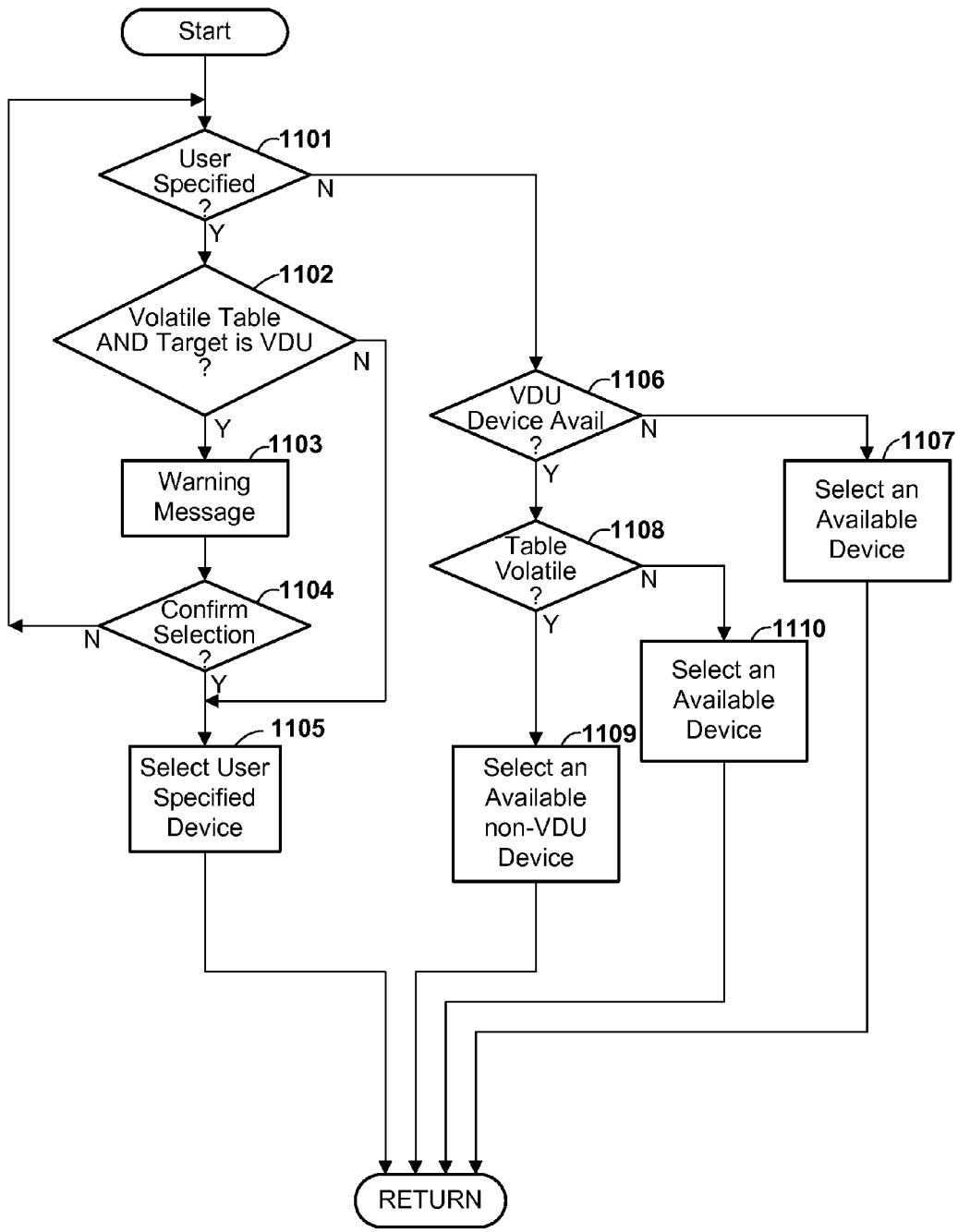
FIG. 11 is a flow diagram illustrating a process of selecting a device for storing table data when a database table is created or extended, in accordance with one or more preferred and/or optional embodiments.

In one or more embodiments, the database manager chooses a storage device upon which to store the additional database table space to be allocated, represented as optional block 1010 in FIG. 10, and represented in greater detail in FIG. 11. In certain embodiments, the selection of a storage device may take into account the volatility of the database table, as disclosed in greater detail herein. If there is only one storage device available (either because the system has only a single storage device, or the selection is otherwise constrained so that only one device can be selected), optional step 1010 is not performed.

The database manager then allocates additional space for the subject database table in the amount previously determined as the current extension file size (bloc 1011). At approximately the same time, the parameters last extension time 321, last extension size 322, and last extension volatility 323 are updated with current values, for use the next time additional space must be allocated to the database table. The extension size adjustment function then ends and returns.

Selecting Storage Devices for Database Tables Using Volatility

As noted above, in one or more embodiments a volatility attribute associated with a database table is used to automatically determine how table data is stored. In particular, the volatility attribute is used to select a storage device or type of storage device upon which table data is stored. Additionally, in one or more embodiments a volatility attribute may associated with a database table may be used to vary the amount of time database table data is allowed to remain in a write queue or buffer in a storage device before being written to the storage media or deleted from the buffer.

Due to the physical characteristics of storage devices, device path configurations, and so forth, it may be desirable to store volatile table data differently from non-volatile table data. Some devices or device types may be deemed undesirable for storage of volatile table data if more suitable storage devices are available. Such a device is designated herein a volatile-data-unsuitable (VDU) storage device. An example of a VDU storage device is a solid state drive using flash memory technology, where a conventional rotating magnetic disk drive is an available alternative. A solid state flash memory drive has reasonably fast read access times, but write access is relatively slow. Because a volatile database table tends to require a high volume of write operations, it is undesirable to store the volatile table in a device with slow write times, as this may create a bottleneck to performance. Not only the physical type of storage device, but the device path configuration may determine whether a device is to be deemed a VDU device. For example, a storage device on a more remote path, or one have very constrained bandwidth, might be considered unsuitable for storage of volatile table data. It will be understood that the designation of a device as a VDU storage device is meaningful only in relation to other available storage devices. If all devices have approximately the same characteristics, then no single device should be considered a VDU storage device.

In accordance with one or more embodiments, in a system having at least one VDU storage device and at least one non-VDU storage device, data records of a volatile database table are preferentially stored on the at least one non-VDU storage device. This is preferably accomplished using two asynchronous processes, one of which automatically selects a device for storing table data when a database table is created or extended, and a second which migrates database table data from time to time to balance and more efficiently utilize storage resources.

FIG. 11 is a flow diagram illustrating a process performed by the database manager of selecting a device for storing table data when a database table is created or extended, in accordance with one or more preferred and/or optional embodiments. Referring to FIG. 11, upon triggering the selection process, in one or more embodiments the user (such as a database administrator or similar person) may optionally specify the storage device upon which data from a subject database table is to be stored, although the user is not required to do so. User selection can be performed by presenting the user with an interactive selection screen, or a previously made selection can be saved by setting the manually specified storage flag 324 and storing the specified storage device ID in storage device ID field 325 in the database table header. If the user specifies a target storage device (the 'Y' branch from block 1101), the system determines whether the subject database table is considered 'volatile' and the selected target is a VDU device. If both conditions are met (the 'Y' branch from block 1102), a warning message is issued to the user to the effect that the selected storage device may be unsuitable for a volatile database table (block 1103, which may be optional). The user may then confirm the selection (the 'Y' branch from block 1104), or cancel the selection and return to make another choice or allow the machine to choose (the 'N' branch from block 1104). If the conditions for the warning message are not met or the user confirms the selection after the warning, the user selection is saved by setting the user specified storage flag 324 and saving the storage device ID in field 325, and the user-designated device is selected (block 1105).

If the user does not make a selection (the 'N' branch from block 1101), then if the available storage includes at least one VDU storage device, the 'Y' branch is taken from block 1106 to block 1108; otherwise the 'N' branch is taken to block 1107. It will be noted that, if there is at least one VDU storage device, then there is at least one non-VDU storage device, for as explained above, a device can only be a VDU storage device if there is at least one preferred alternative for storing volatile table data.

If the 'N' branch is taken from block 1106, then all storage devices are considered more or less equally suitable for storing volatile table data or non-volatile table data. In that case, an available storage device is selected for storing the data in the subject database table using any suitable criteria (block 1107). In a simple embodiment, the available storage device having the largest proportion of unused storage capacity is chosen. However, it will be appreciated that the selection criteria could be more complex, and other or additional factors could be used. For example, available I/O bandwidth, determined by sampling storage device I/O operations in a recent interval, might be taken into consideration.

If the 'Y' branch from block 1106 is taken to block 1108, then if the subject database table to be stored is considered 'volatile', the 'Y' branch is taken from block 1108. Where the only database table volatility attribute available is the binary volatility attribute (i.e, a table is either 'volatile' or 'non-volatile'), whether manually specified or automatically determined, then the test performed at block 1108 depends directly on the value of this attribute. If a volatility attribute is available as a value in a range, such as a normalized floating point value between 0 and 1, then the test performed at block 1108 depends on whether the volatility exceeds some threshold. For example, in the case of a normalized floating point attribute between 0 and 1, the table could be considered 'volatile' if the normalized value exceeds 0.5. This threshold might be fixed, or might be adjusted from time to time to take account of available storage. For example if there is relatively little VDU storage available and an abundance of non-VDU storage, the threshold could be lowered incrementally so that more tables would be considered 'volatile' for purposes of placing them in non-VDU storage (and vice-versa). This could be determined, e.g., by a simple comparison of percent of capacity used or available in the VDU devices versus the non-VDU devices, although other techniques (including manually specifying the threshold) would be possible.

If the subject table is considered 'volatile' and the 'Y' branch taken from block 1108, a non-VDU storage device is selected for storing the subject table data (block 1109). Where more than one non-VDU device is available, one of the non-VDU devices is chosen based on any suitable criteria. In an embodiment, the available non-VDU device having the largest proportion of unused storage capacity is chosen. In an alternative embodiment, the available non-VDU device having the smallest proportion of data from volatile database tables is chosen. In a further alternative, the available non-VDU devices may be ranked by weighting these two ranking factors in any appropriate combination. Other or additional factors could be used.

If the subject table is not considered volatile and the 'N' branch is taken from block 1108, a storage device is selected from for storing the subject table data from among the available storage devices (block 1110). Any suitable criteria for selecting a storage device could be used, and the device is not constrained to be either a VDU or a non-VDU device. The selection criteria could be the same as those used in block 1107. Alternatively, the selection criteria could favor the use of a VDU device.

Due to various changes occurring in the system environment and the use of the database, it may be desirable to migrate files from one storage device to another from time to time. For example, volatility of certain databases may change, so that files which were originally stored on an appropriate device no longer are. Additionally, the volume of data stored on the various devices may become unbalanced as a result of numerous additions and deletions.

Figure 12:
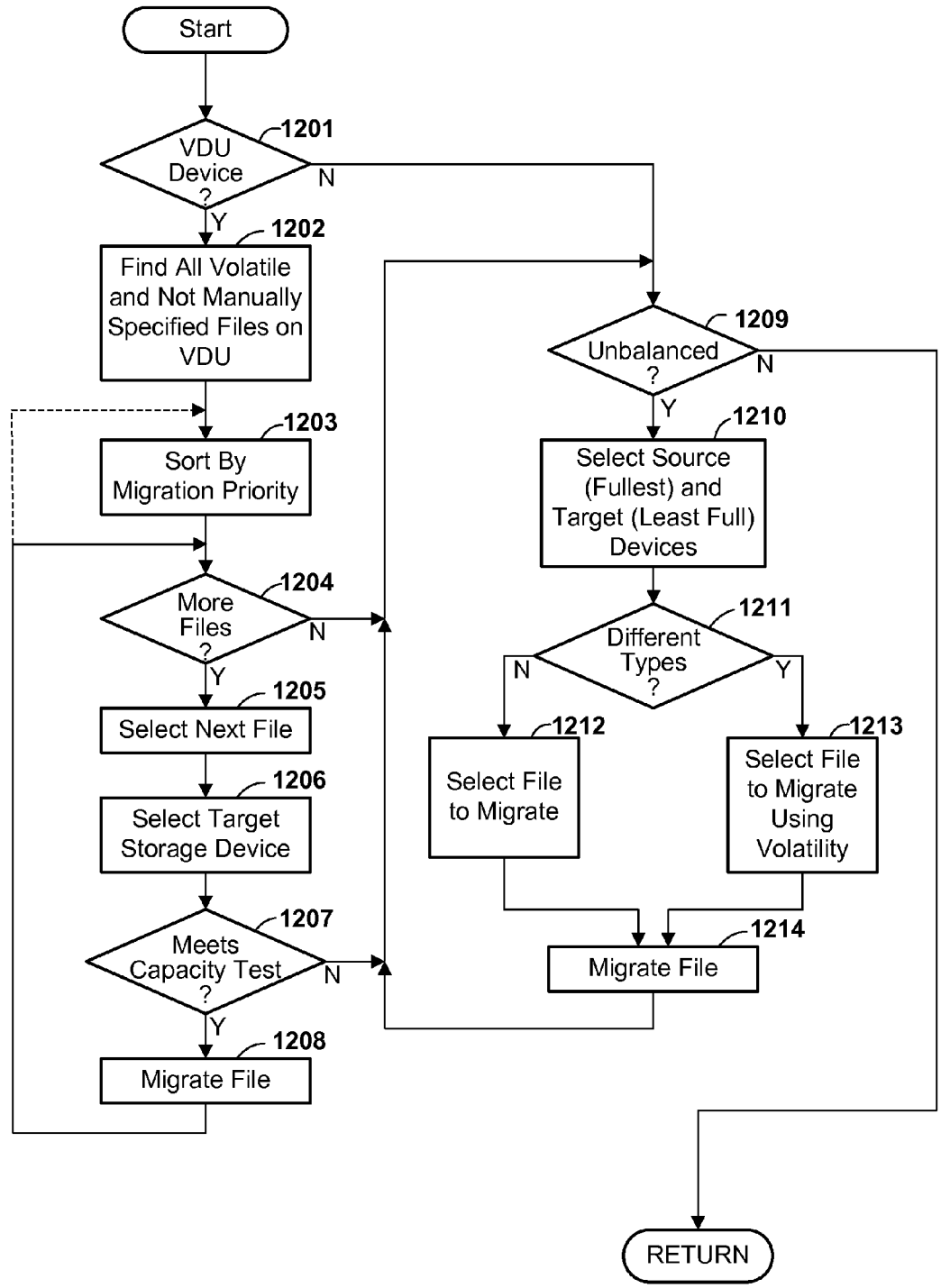
FIG. 12 is a flow diagram illustrating a process of migrating one or more database files to optimize and/or balance storage usage for the database, in accordance with one or more preferred and/or optional embodiments.

FIG. 12 is a flow diagram illustrating a process performed by the database manager in migrating one or more database files to optimize and/or balance storage usage for the database, in accordance with one or more preferred and/or optional embodiments. A migration process as shown in FIG. 12 may be triggered periodically, and/or responsive to allocation of storage space (e.g. by creation of a new database table or metadata structure, or by extension of an existing database table), and/or responsive to some other event which indicates a possibility the storage resources are unbalanced, such as a storage operation queue for one of the devices exceeding some threshold.

Referring to FIG. 12, if the available storage includes at least one VDU storage device, the 'Y' branch is taken from block 1201 to block 1202, and the database manager will attempt to migrate volatile database files away from VDU devices (blocks 1202-1208); otherwise the 'N' branch is taken to block 1209, and blocks 1202-1208 are skipped. The test performed at block 1201 is essentially the same as that of block 1106, explained above.

At block 1202, the migration process finds all files containing data from database tables considered 'volatile' which are stored on any VDU device, and which are not required to be stored on a manually specified storage device (manually specified storage flag 324 is not set). These files are the first candidates for migration. The test for volatility is the same as that performed in block 1108. I.e., either the binary volatility attribute ('volatile' or 'non-volatile') may be used, or a value in a range, such as a normalized floating point value between 0 and 1, can be compared with a threshold.

The migration candidate found at block 1202 are sorted in order of migration priority (block 1203). Preferably, where the volatility attribute is a value within a range, the files are sorted in order of measure of volatility, the files from database tables having the highest volatility being given the highest priority for migration. Where only a binary volatility attribute is used (so that all volatile files have the same volatility), the sorting may be based on some other criterion, such as the proportion of the source storage device's capacity which is used by volatile files, or the total proportion of the source storage device's capacity which is used.

If any (more) volatile files remain to be migrated, the 'Y' branch is taken from block 1204 to block 1205 (to migrate a file). When no more volatile files remain to be migrated, the 'N' branch is taken to block 1208, where additional migration may be performed to balance load.

At block 1205, the next file according to the sorting priority is selected. A target storage device is then selected for receiving the selected file (block 1206). Preferably, the selection uses the same criteria as are used to select a non-VDU device at block 1109, although other criteria could be used.

Before migrating the selected file to the selected target device, a target capacity test is performed. If the unused capacity of the target after the proposed migration will be more than some low threshold (such as 10% of total capacity) OR will be more than the unused capacity of the source after migration, i.e.:

CapacityUnusedTarget>MIN(LowLimit, CapacityUnusedSource), then the 'Y' branch is taken from block 1207, and the selected file is migrated to the selected target device (block 1208). If not, the 'N' branch is taken to block 1209.

After migrating the file at block 1208, control proceeds to block 1204 to determine whether more volatile files remain to be migrated. In an alternative embodiment, if the sorting of files to be migrated at block 1203 is dependent on the unused capacity of the source file, then control proceeds from block 1208 to block 1203, to re-sort the files.

When the migration of volatile files from VDU devices is finished, either by taking the 'N' branch from block 1204 or the 'N' branch from block 1207, the database manager tests to determine whether an imbalance condition in the use or allocation of storage exists which should be remedied (block 1209). A simple imbalance might be in the proportion of storage space which is used/allocated in each storage device, i.e., one device might be nearly full, while another has a substantial proportion of unused capacity. Such an imbalance can be determined by sorting the devices in order of proportion of unused capacity, determining whether:

CapacityUnusedLowest<$T_{CAPLOW}$ AND

CapacityUnusedHighest/CapacityUnusedLowest>$T_{CAPRATIO}$ where CapacityUnusedLowest (or CapacityUnusedHighest) is the unused capacity (as a proportion of total capacity) of the device with lowest (or highest) proportion of unused capacity, $T_{CAPLOW}$ is a predetermined low capacity threshold, and $T_{CAPRATIO}$ is a predetermined capacity imbalance ratio. Exemplary values of $T_{CAPLOW}$ and $T_{CAPRATIO}$ might be 0.25 and 2, respectively, it being understood that other threshold values could be chosen.

If an imbalance does not exist, the 'N' branch is taken from block 1209 and the migration process ends. If an imbalance exists, the storage device having lowest unused capacity is selected as a source for a migration file, and the device having the highest unused capacity is selected as the target (block 1210).

If the source and target device are both non-VDU devices or both VDU devices (and therefore equally suitable or unsuitable to storing data from volatile database tables), the 'N' branch is taken from block 1211. In this case, a file to migrate is selected without regard to volatility, using any appropriate criteria (block 1212).

If the source and target device are not both VDU or both non-VDU, the 'Y' branch is taken from block 1211. In this case, a file to migrate is selected, taking into account volatility (block 1213). Specifically, if migrating from a VDU device to a non-VDU device, the database table file with highest volatility is given priority for migration (among database table files). This volatility may be less than the threshold used for selecting files to migrate in block 1202. If migrating in the opposite direction, the database table file with lowest volatility is given priority among database table files For any of various reasons, the database manager may choose to migrate a file containing something other than database table data, such as a file containing metadata or query objects. Although volatility of such data is not separately tracked in the embodiments described herein, it is possible to assume a volatility for purposes of migration (e.g. consider all query objects non-volatile, consider index files volatile, etc.) The same principle can be applied to other types of data, even data unrelated to the database. For example, a file containing executable computer programming code would generally be considered non-volatile for purposes of migration.

The selected file is then migrated from the selected source device to the selected target device (block 1214), and the migration process control loops back to block 1209 to again determine whether the storage devices can be considered "balanced". If the devices are still not balanced, the process repeats by selecting and migrating another file. When the devices are considered "balanced, the 'N' branch is taken from block 1209 and the migration process returns.

In the migration process described above, "balance" is determined solely by reference to relative unused storage capacity. However, another form of imbalance is an imbalance in I/O operations performed among similar devices. For example, if there is a substantial difference between the number of I/O operations performed by two separate but essentially similar devices (same capacity, same device type, equivalent I/O paths), then migration of files to balance the I/O load might be indicated. A further alternative balancing test is to consider the amount of volatile table storage on each storage device, attempting to equalize the amount of volatile table storage on each storage device. A balancing test performed at block 1209 could alternatively or additionally take into account the volume of storage access operations for particular files and/or the amount of storage on each storage device allocated to volatile database tables.

Managing MQTs Based on Table Volatility

Database 203 may contain one or more materialized query tables (MQTs), also known as materialized views, of which one MQT 229 is represented in FIG. 2, it being understood that the number may very. MQT 229 is a metadata structure which contains data that would be produced by executing an underlying query. Typically, the MQT is generated initially by executing the underlying query, and is thereafter maintained in some manner. The MQT may be subsequently maintained by incremental updating rather than re-executing the underlying query. It may also be maintained at intervals, so that data in the MQT is not necessarily current, but reasonably close to current data and therefore useful for a variety of applications which require only approximations to actual data. The purpose of the MQT is to improve efficiency of executing certain queries, which include not only the underlying query, but other queries which return subsets of the MQT data, and therefore might be more efficiently executed against the MQT than against the entire database. The MQT does not provide data which would otherwise be unavailable, because it is always possible to obtain the data by reference to the source data in the database tables (e.g., to re-execute the underlying query which forms the basis for the MQT).

Where an MQT contains volatile table data, the burden of maintaining the MQT is increased and/or the accuracy of the MQT data is reduced as a result of table volatility. Therefore, MQTs which include volatile table data are likely to be less useful from the standpoint of improving efficiency than MQTs which contain data only from non-volatile tables. In general, it is expected that the burden of maintaining an MQT containing volatile table data will outweigh any potential efficiency improvements from having the MQT available, although there will of course be exceptions.

In one or more embodiments, database manager includes an MQT manager function 214 which, among other things, automatically determines whether to maintain results of a particular query as an MQT. This determination may depend on such factors as the frequency at which the underlying query (or queries which might utilize the MQT) are executed, the relative difficulty of obtaining the data from the source database table(s) as opposed to obtaining it from the MQT, etc., and any evaluation technique, now known or hereafter developed, may be applied. In accordance with one or more embodiments, such an evaluation technique is modified to restrict the creation, maintenance or use of an MQT containing volatile table data.

In one embodiment, an evaluation technique of the MQT manager function which determines whether to maintain an MQT is modified to prevent the MQT from being maintained in all cases if it contains volatile table data. Whether an MQT contains volatile table data is determined by reference to the volatility attribute(s) of the table(s) from which MQT data is taken. As disclosed, volatility attributes may be binary ('volatile' vs. 'non-volatile') or numeric values within a range. In the latter case, the data is considered volatile if the table's volatility value exceeds some threshold, for example, in the case of a normalized volatility, a threshold in excess of 0.5. In cases where the MQT does not contain volatile table data, the evaluation technique applies any conventional criteria to determine whether to maintain the MQT.

In another embodiment, the evaluation technique of the MQT manager function is modified to take into account volatility and thus restrict the use of MQT's for volatile table data, without preventing their use in all cases. For example, the MQT manager function may generate a figure of merit for each potential MQT based on query execution frequency and other factors, so that the greater the frequency of execution, the greater the figure of merit. Volatility of the data could reduce this figure of merit, and, if a numeric value volatility attribute is used, the reduction would be greater as the volatility is greater. It would thus be possible to determine to maintain an MQT containing volatile table data, for example, if the frequency of execution was extremely high, but volatility only moderately so, although in general an MQT will be less likely for volatile table data.

In a further embodiment, volatility is determined separately for each field or each of one or more fields of a database table, and the MQT manager function refers to the specific fields included in the MQT, rather than the source database table as a whole. Such an embodiment produces greater accuracy of the determination, at some additional overhead associated with maintaining volatility data separately for multiple fields. For example, a database table might be very volatile only because certain fields are frequently updated, but if these fields are not included in the MQT, this volatility should not affect the determination whether to maintain the MQT.

Managing Indexes Based on Table Volatility

Database 203 may contain one or more indexes 223-226. Indexes are primarily used to efficiently execute queries against data in the database tables. An index manager 215 maintains the various indexes. Generally, indexes are maintained on a continuous basis, so that each time data in a database table changes, any indexes which are affected by that change are updated. Maintaining an index can involve substantial overhead, but can also significantly improve query execution performance. The choice of indexes to be maintained is an important feature of the design of a large database. Lack of a critical index may mean that many queries execute inefficiently, yet too many indexes which are underused means unnecessary overhead of maintenance.

In order to support the intelligent use of indexes, an index manager may include an advisory function which provides advice to a user, such as a database administrator, regarding the desirability of an index. Typically, the advisory function is invoked by the user desiring to analyze and improve database performance. The advisory function analyzes statistics regarding query type and frequency to identify potential fields which might be indexed to some advantage, and presents this information to the user. The advisory function may generate a respective figure of merit for each of multiple potential fields to be indexed, the figure of merit representing a relative desirability of an index for the particular field. The formula used for generating a figure of merit may be complex and may take into account multiple factors. In some cases, the advisory function may recommend abandoning maintenance of an existing index if it appears that the index is underused. Typically, the user makes the ultimate decision whether to maintain a particular index, although in one or more alternative embodiments, an advisory function could automatically create or delete indexes according to its own recommendations.

In accordance with one or more embodiments, an index manager advisory function takes one or more database volatility attributes into account in determining whether to recommend the creation of, or whether to automatically create, a database index. In particular, the index manager advisory function uses one or more volatility attributes to compute a figure of merit for a potential database field to be indexed.

Volatility attributes may be factored in multiple ways. In one example, queries against data in a volatile table may benefit from an index probe or scan (as opposed to a table scan), and therefore a high volatility of a table may be one of multiple factors influencing a higher figure of merit for a potential index. In another example, if volatility is separately tracked for multiple fields in a database table, a high volatility of a particular field may be factored into the potential cost of maintaining the index, thus reducing the figure of merit (and possibly giving priority to other, less volatile, fields as alternatives for indexing.

Other Variations

Although a series of steps has been described above as one or more preferred and/or alternate embodiments, it will be appreciated that many variations of processes for monitoring and determining volatility of a database table and using database table volatility attributes to manage a database are possible. In particular, some steps may be performed in a different order, different data structures may be used, and/or different hardware or software resources may be employed to perform functions described herein. Furthermore, although certain formulae and variations thereof have been disclosed herein for determining volatility and taking certain actions based on volatility of database table data, it will be appreciated that these formulae and variations thereof are only some of the possible embodiments of a system which takes certain actions to maintain a database based on volatility of database table data, and that other formulae involving the same or different inputs could alternatively be used.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. Examples of a computer readable storage medium are illustrated in FIG. 1 as system memory 102 and data storage devices 125-128. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Unless inconsistent with the invention or otherwise qualified herein, computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Although a specific embodiment of the invention has been disclosed along with certain alternatives, it will be recognized by those skilled in the art that additional variations in form and detail may be made within the scope of the following claims:

What is claimed is:

1. A non-transitory computer-readable media having stored thereon an executable computer program for managing a computerized database, executable computer program instructs at least one computer system to perform actions comprising:

storing at least one respective volatility attribute for each of at least one database table of said computerized database, each volatility attribute expressing volatility of at least a portion of a respective database table of said computerized database, said volatility of at least a portion of a respective database table being a property of the respective database table that is a function of changes to data recorded in said at least a portion of the respective database table with respect to time;

selectively determining whether to maintain at least one metadata structure, each metadata structure of the at least one metadata structure containing respective metadata describing data in at least a first database table of said at least one database table, the determining whether to maintain at least one metadata structure being performed using at least one volatility attribute expressing volatility of at least a portion of the first database table, wherein maintaining the at least one metadata structure comprises updating the metadata in the at least one metadata structure responsive to changes to the data in the at least a first database table; and responsive to determining to maintain a first metadata structure of the at least one metadata structure, maintaining the first metadata structure, wherein maintaining the first metadata structure comprises updating the metadata in the first metadata structure responsive to changes to the data in the at least a first database table.

2. The non-transitory computer readable media of claim 1, wherein said at least one metadata structure comprises a materialized query table.

3. The non-transitory computer readable media of claim 1, wherein said at least one metadata structure comprises an index.

4. The non-transitory computer readable media of claim 1, wherein the instructions further cause the at least one computer system to perform:

monitoring at least one respective parameter of each said database table of said computerized database over at least one time interval and saving monitored parameter data with respect to the respective database table; and determining a respective volatility state of each said database table using the saved monitored parameter data to automatically generate said at least one respective volatility attribute for each said database table.

5. The non-transitory computer readable media of claim 4, wherein the instructions further cause the at least one computer system to perform:

computing a respective figure of merit representing volatility of the at least a portion of the respective database table for each of said at least one time interval.

6. The non-transitory computer readable media of claim 1, wherein said volatility attribute comprises a quantitative value.

7. A computer system supporting a database, comprising:

a memory;

at least one processor executing instructions contained in said memory;

a database manager embodied as instructions stored in non-transitory media of said computer system and executable on said at least one processor, said database manager managing said database and providing access to data in at least one database table of said database;

wherein said database manager stores at least one respective volatility attribute for each said at least one database table, each volatility attribute expressing volatility of at least a portion of the respective database table, each said volatility of at least a portion of a respective database table being a property of the respective database table that is a function of changes to data recorded in the at least a portion of the respective database table with respect to time;

wherein said database manager further selectively determines whether to maintain at least one metadata structure, each metadata structure of the at least one metadata structure containing respective metadata describing data in at least a first database table of said at least one database table, the determining whether to maintain at least one metadata structure being performed using at least one volatility attribute expressing volatility of at least a portion of the first database table, wherein maintaining the at least one metadata structure comprises updating the metadata in the at least one metadata structure responsive to changes to the data in the at least a first database table; and wherein, responsive to determining to maintain a first metadata structure of the at least one metadata structure, said database manager further maintains the first metadata structure by updating the metadata in the first metadata structure responsive to changes to the data in the at least a first database table.

8. The computer system of claim 7, wherein said at least one metadata structure comprises a materialized query table.

9. The computer system of claim 7, wherein said at least one metadata structure comprises an index.

10. The computer system of claim 7, wherein said database manager further:

monitors at least one respective parameter of each said database table of said database over at least one time interval and saves monitored parameter data with respect to the respective database table; and determines a respective volatility state of each said database table using the saved monitored parameter data to automatically generate said at least one respective volatility attribute for each said database table.

11. The computer system of claim 10, wherein said database manager further computes a respective figure of merit representing volatility of the at least a portion of the respective database table for each of said at least one time interval.

12. The computer system of claim 7, wherein each said volatility attribute comprises a respective quantitative value.

* * * * *